United States Patent
Chen et al.

(10) Patent No.: US 11,506,745 B2
(45) Date of Patent: Nov. 22, 2022

(54) VEHICULAR SELF-POSITIONING

(71) Applicant: TERRANET AB, Lund (SE)

(72) Inventors: Junshi Chen, Lund (SE); Meifang Zhu, Lund (SE); Fredrik Tufvesson, Lund (SE)

(73) Assignee: TERRANET AB, Lund (SE)

( * ) Notice: Subject to any disclaimer, the term of this patent is extended or adjusted under 35 U.S.C. 154(b) by 472 days.

(21) Appl. No.: 16/615,094

(22) PCT Filed: Jun. 1, 2018

(86) PCT No.: PCT/SE2018/050557
§ 371 (c)(1),
(2) Date: Nov. 19, 2019

(87) PCT Pub. No.: WO2018/222124
PCT Pub. Date: Dec. 6, 2018

(65) Prior Publication Data
US 2020/0166601 A1 May 28, 2020

(30) Foreign Application Priority Data

Jun. 1, 2017 (SE) .................................... 1750694-0

(51) Int. Cl.
*G01S 5/02* (2010.01)
*H04W 64/00* (2009.01)
*H04W 72/04* (2009.01)

(52) U.S. Cl.
CPC .......... *G01S 5/0273* (2013.01); *G01S 5/0215* (2013.01); *G01S 5/0294* (2013.01); *H04W 64/00* (2013.01); *H04W 72/042* (2013.01)

(58) Field of Classification Search
CPC .... G01S 5/0009; G01S 5/0045; G01S 5/0063; G01S 5/02; G01S 5/0215; G01S 5/0218;
(Continued)

(56) References Cited

U.S. PATENT DOCUMENTS 5,852,630 A * 12/1998 Langberg ............ H04L 27/2647
375/219
10,180,499 B2 * 1/2019 Lee ........................ H04W 4/027
(Continued)

FOREIGN PATENT DOCUMENTS

WO WO 2011/012882 A1 2/2011

OTHER PUBLICATIONS

Multipath Assisted Positioning in Vehicular Applications by Markus Ulmschneider, Ronald Raulefs, Christian Gentner and Michael Walter, dated Oct. 2016 (Year: 2016).*
(Continued)

*Primary Examiner* — Siu M Lee
(74) *Attorney, Agent, or Firm* — Birch, Stewart, Kolasch & Birch, LLP

(57) ABSTRACT

A method for vehicular self-positioning is executed by a positioning device in a vehicle. The positioning device computes a current estimated position of the vehicle as a function of local motion data obtained from a motion sensor in the vehicle, and operates an RF module in the vehicle to receive a reference signal from one or more base stations in an environment of the vehicle, the respective base station being configured for telecommunication and being part of a 3GPP infrastructure. The positioning device further processes the reference signal to determine measured values of at least one path parameter for a selected set of multipath components, and operates a positioning algorithm, e.g. SLAM, on at least the current estimated position and the measured values to calculate a current output position of the vehicle and position information for an origin of each of the multipath components.

27 Claims, 8 Drawing Sheets

(58) Field of Classification Search
CPC .. G01S 5/0221; G01S 5/02585; G01S 5/0263; G01S 5/0273; G01S 5/0294; H04W 64/00; H04W 64/006; H04W 72/042
See application file for complete search history.

(56) References Cited

U.S. PATENT DOCUMENTS

| | | | |
|---|---|---|---|
| 10,417,469 B2* | 9/2019 | Davidson | G01C 21/28 |
| 10,656,282 B2* | 5/2020 | Irish | G01S 19/426 |
| 2001/0022558 A1 | 9/2001 | Karr, Jr. et al. | |
| 2013/0237246 A1 | 9/2013 | Aggarwal et al. | |
| 2015/0346333 A1 | 12/2015 | Soto et al. | |
| 2016/0033265 A1 | 2/2016 | Le Grand et al. | |
| 2016/0066157 A1 | 3/2016 | Noorshams et al. | |
| 2016/0277893 A1 | 9/2016 | Katabi et al. | |
| 2016/0309298 A1 | 10/2016 | Dupray et al. | |
| 2016/0366554 A1 | 12/2016 | Markhovsky et al. | |
| 2017/0195834 A1 | 7/2017 | Na et al. | |
| 2018/0088185 A1* | 3/2018 | Woods | G06F 3/0304 |

OTHER PUBLICATIONS

Multipath Assisted Positioning for Pedestrians using LTE Signals by Markus Ulmschneider and Christian Gentner, IEEE 2016 (Year: 2016).*
Extended European Search Report, dated Jan. 27, 2021, for European Application No. 18809901.4.
Driusso et al., "Vehicular position tracking using LTE signals", IEEE, 2016, pp. 1-16.
Gentner et al., "Multipath Assisted Positioning with Simultaneous Localization and Mapping", IEEE Transactions on Wireless Communications, 2016, pp. 1-14.
Leitinger et al., "Factor Graph Based Simultaneous Localization and Mapping Using Multipath Channel Information", 2017, total 7 pages.
Mahler et al., "Tracking of Wideband Multipath Components in a Vehicular Communication Scenario", IEEE, 2015, pp. 1-11.
Munkres, "Algorithms for the Assignment and Transportation Problems", Journal of the Society for Industrial and Applied Mathematics, Mar. 1957, vol. 5, No. 1, pp. 32-38, total 8 pages.
Ordóñez-Hurtado et al., "Cooperative Positioning in Vehicular Ad-hoc Networks Supported by Stationary Vehicles", Feb. 3, 2018, pp. 1-8.
Schuhmacher et al., "A Consistent Metric for Performance Evaluation of Multi-Object Filters", IEEE Transactions on Signal Processing, Aug. 2008, vol. 56, No. 8, pp. 3447-3457.
Su et al., "Joint Channel Estimation Methods in Carrier Aggregation OFDM Systems", IEEE, 2014, total 5 pages.
Ulmschneider et al., "Multipath Assisted Positioning for Pedestrians using LTE Signals", IEEE, 2016, total 8 pages.
Ulmschneider et al., "Multipath Assisted Positioning in Vehicular Applications", 2016 13th Workshop on Positioning, Navigation and Communications (WPNC), Oct. 19-20, 2019, Bremen, Germany, pp. 1-6.
Vasisht et al., "Decimeter-Level Localization with a Single WiFi Access Point", 13th USENIX Symposium on Networked Systems Design and Implementation (NSDI '16), Mar. 16-18, 2016, Santa, CA, pp. 165-178, total 15 pages.
Yang et al., "Channel Frequency Response Estimation for MIMO Systems with Frequency-Domain Equalization", Hindawi Publishing Corporation, EURASIP Journal on Advances in Signal Processing, 2011, vol. 2011, Article ID 501703, total 14 pages.
Yao et al., "Improving Cooperative Positioning for Vehicular Networks", IEEE Transactions on Vehicular Technology, Jul. 2011, vol. 60, No. 6, pp. 2810-2823.

* cited by examiner

VEHICULAR SELF-POSITIONING

TECHNICAL FIELD

The present invention relates generally to techniques for positioning a vehicle, and in particular to such positioning based on multipath components of a radio signal arriving at a receiver located in the vehicle.

BACKGROUND ART

The rapid growth of available services and applications depending on location awareness in intelligent transportation systems (ITSs) has led to an ever increasing demand for precise localization and tracking systems.

The positioning accuracy of global navigation satellite systems (GNSSs) is not sufficient for many applications. Furthermore, certain scenarios such as urban canyons or tunnels pose an additional challenge due to multipath propagation and blocking of signals. Hence, especially in such areas, there is a high demand for complementary positioning systems.

Recently, it has been proposed to exploit multipath propagation for positioning, rather than trying to mitigate its influence. In the article "Multipath Assisted Positioning in Vehicular Applications", by Ulmschneider et al, published in 2016 13th *Workshop on Positioning, Navigation and Communications* (WPNC), 2016, pp 1-6, it is proposed to treat each multipath component that arrives at a receiver in a vehicle as a separate signal sent synchronously from a virtual transmitter arranged in line-of-sight (LOS) to the receiver. Since the positions of the virtual and possibly also of the physical transmitters are unknown, it is proposed to estimate their positions jointly with the receiver position in a simultaneous localization and mapping (SLAM) algorithm as the vehicle, and thus the receiver, moves through an environment comprising one or more physical transmitters. The SLAM algorithm operates on distance and angle of arrival (AoA) information computed for the respective multipath component, and the heading and velocity of the vehicle given by on-board sensors. Tests presented in the article are made for RF transmitters operating at a carrier frequency of 1.51 GHz and a signal bandwidth of 100 MHz and result in a positioning error (RMSE) of about 18 m when the vehicle has traveled a distance of 600 m. A positioning error of this magnitude is unacceptable in most practical situations, e.g. in ITSs.

BRIEF SUMMARY

It is an objective of the invention to at least partly overcome one or more limitations of the prior art.

Another objective is to provide a cost-effective implementation of vehicular positioning based on multipath components.

A further objective is to achieve an improved positioning accuracy of vehicular positioning based on multipath components.

One or more of these objectives, as well as further objectives that may appear from the description below, are at least partly achieved by a computer-implemented positioning method, a computer-readable medium and a positioning device according to the independent claims, embodiments thereof being defined by the dependent claims.

A first aspect of the invention is a computer-implemented positioning method executed by a controller in a vehicle. The positioning method comprises: obtaining local motion data generated by a motion detector in the vehicle; computing a current estimated position of the vehicle as a function of the local motion data; operating an RF module in the vehicle to receive a reference signal from at least one base station in an environment of the vehicle, wherein the at least one base station is configured for telecommunication and is part of a 3GPP infrastructure; processing the reference signal to determine measured values of at least one path parameter for a selected set of multipath components; and operating a positioning algorithm on at least the current estimated position and the measured values to calculate a current output position of the vehicle and position information for an origin of each of the multipath components, wherein the positioning algorithm is configured to assume a linear path between the RF module and the position of the origin for each of the multipath components.

A second aspect of the invention is a computer-readable medium comprising computer instructions which, when executed by a controller, cause the controller to perform the method of the first aspect and any of its embodiments.

A third aspect of the invention is device configured to perform the method of the first aspect and any of its embodiments.

A fourth aspect of the invention is a positioning device for a vehicle. The positioning device comprises: a motion detector configured to generate local motion data for the vehicle, an RF module, and a controller. The controller is configured to: obtain the local motion data from the motion detector; compute a current estimated position of the vehicle as a function of the local motion data; operate the RF module to receive a reference signal from at least one base station in an environment of the vehicle, wherein the at least one base station is configured for telecommunication and is part of a 3GPP infrastructure; process the reference signal to determine measured values of at least one path parameter for a selected set of multipath components; and operate a positioning algorithm on at least the current estimated position and the measured values of the at least one path parameter to calculate a current output position of the vehicle and position information for an origin of each of the multipath components, wherein the positioning algorithm is configured to assume a linear path between the RF module and the position of origin for each of the multipath components.

Other objectives, as well as features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Embodiments of the present invention will now be described more fully hereinafter with reference to the accompanying drawings, in which some, but not all, embodiments of the invention are shown. Like reference signs refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Figure 1:
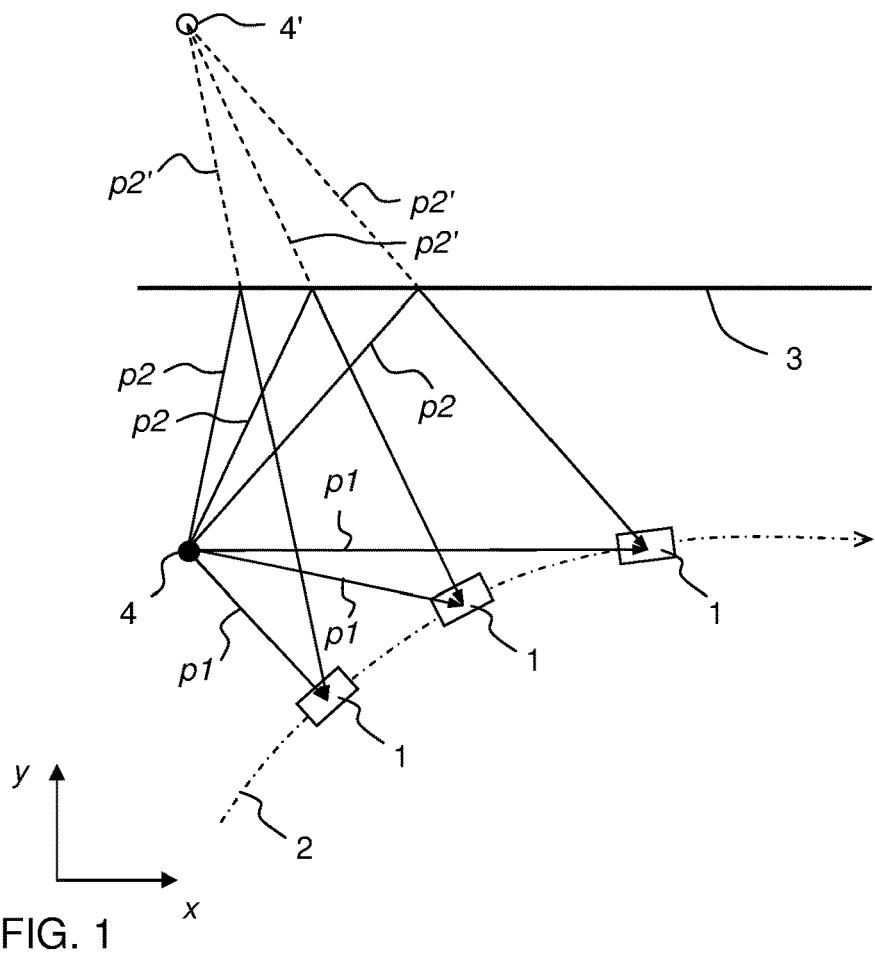
FIG. 1 is a top plan view of signal paths from a single physical transmitter to a vehicle moving along a trajectory.

FIG. 1 illustrates a vehicle 1 that moves along a trajectory 2 in a scenery that includes a reflecting surface 3, e.g. a part of a building or a tunnel wall. FIG. 1 illustrates the vehicle 1 at three different time instances on the trajectory 2. A physical transmitter 4 is arranged to generate and broadcast an RF signal that is intercepted by a receiver (not shown) in the vehicle 1. At each time instant, the RF signal reaches the vehicle 1 on a linear path or line-of-sight (LOS) path p1 and a non-line-of-sight (NLOS) path p2. On the NLOS path p2, the RF signal is reflected at the surface 3. As explained in the Background section, the NLOS path p2 may be treated as an LOS path p2' from a virtual transmitter 4' at a position which is the position of the physical transmitter 4 mirrored in the surface 3. In the drawings, physical and virtual transmitters 4, 4' are indicated by filled circles and open circles, respectively. It is understood that, as the vehicle 1 moves along the trajectory 2, the position of the physical and virtual transmitters 4, 4' are static and the virtual transmitter 4' is inherently synchronized to its physical transmitter 4.

Figure 2:
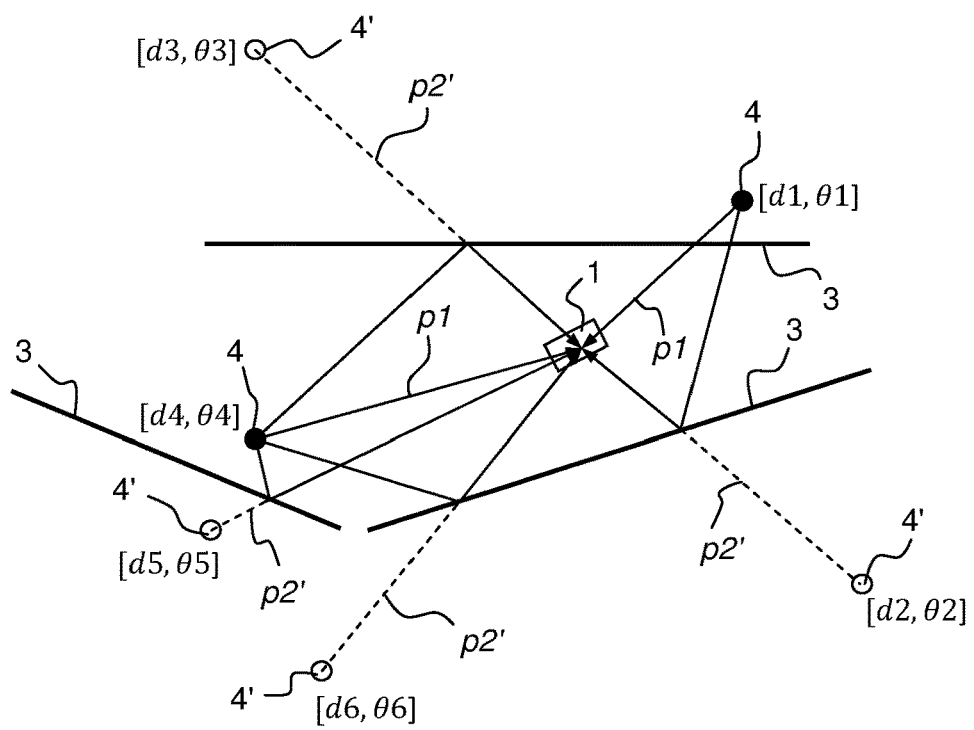
FIG. 2 is a top plan view of signal paths from two physical transmitters to a vehicle in an environment with plural reflecting objects.

FIG. 2 illustrates a vehicle 1 at a given time instant in an environment with three reflecting surfaces 3 and two physical transmitters 4. In this example, accounting only for NLOS paths with a single reflection against one of the surfaces 3, four virtual transmitters 4' may be defined. Thus, the receiver in the vehicle 1 receives RF signals on six paths p1, p2' from two different physical transmitters 4'. FIG. 2 also schematically indicates path parameters determined by the positioning device for the respective path p1, p2'. In the illustrated example, these path parameters include a propagation length d, i.e. a distance between the respective transmitter 4, 4' and a reference position on the vehicle, and an angle-of-arrival (AoA) θ, which is the angle of the respective path p1, p2' in respect of a reference direction of the vehicle. As understood by the skilled person, the AoA may be determined with high accuracy if the receiver comprises an array antenna system. In FIG. 2, the path parameter values [d, θ] are enumerated 1-6 to indicate an association with a respective transmitter 4, 4'.

Embodiments of the invention relate to techniques that enable a positioning device in the vehicle 1 to determine the position of the vehicle 1 based on the one or more path parameters measured for the paths p1, p2' of one or more RF signals that are generated by one or more physical transmitters 4. In the following, the signal components that arrive at the receiver on different paths from a common physical transmitter 4 are denoted multipath components (MPCs). Thus, the MPCs correspond to the paths p1, p2'. The techniques disclosed herein do not differentiate between physical and virtual transmitters: each MPC arriving at the receiver, no matter if via an LOS path or an NLOS path, is treated as a signal from a transmitter in a pure LOS condition.

Although not shown in FIGS. 1-2, it should be understood that the vehicle 1 may receive the RF signals on NLOS paths comprising more than one reflection against the surfaces 3. Depending on implementation, such NLOS paths may or may not be assigned a respective virtual transmitter 4' and be included among the MPCs.

In some embodiments, the positioning device may be configured to differentiate between RF signals from different physical transmitters 4, provided that the RF signals enable such differentiation.

In some embodiments, the MPCs may also include RF signals that are scattered, e.g. from a punctual scatterer. In contrast to a reflection, in which the reflected signal has the same angle to the surface normal as the incident signal, scattering occurs if a signal (electromagnetic wave) impinges on an object and the energy is spread out in all directions. The incorporation of scattering will not be described in further detail herein, but is straight-forward for the skilled person based on the teachings in the article by Ulmschneider et al (2016), which is referenced in the Background section and which is incorporated herein in its entirety.

In one embodiment, the respective physical transmitter 4 is a base station (BS) that is configured to transmit 3G, LTE or 5G signals compliant with the 3GPP standard, and the vehicle is equipped with a receiver for receiving and processing such 3G/LTE/5G signals. Thus, the vehicular positioning may be achieved by use of RF signals that are broadcast by the existing and widely available 3GPP infrastructure. Such an embodiment significantly facilitates implementation of the vehicular positioning and reduces or eliminates the need to install dedicated RF transmitters. Further, with the on-going standardization progress of 5G, base stations configured for transmitting 5G signals will also be widely deployed in a near future. The RF signal may be any available downlink reference signal which is generated by a 3G, LTE or 5G BS and has a structure that is known to the positioning device so as to allow the positioning device to determine one or more relevant path parameters for each MPC. One example of such a reference signal is a Common Reference Signal (CRS) transmitted by an LTE BS. Another example is a Position Reference Signal (PRS), which is designed for positioning and may give higher resolution than the CRS. Other examples of reference signals that may be transmitted by the BSs 4 include MBSFN-RS, UE-RS, and CSI reference signals. As a further example, the reference signal may be a dedicated signal generated in accordance with the Cellular Vehicle-to-Everything (V2X) standard in 3GPP LTE Release 14. In this standard, additional DMRS symbols have been added to a dedicated signal to handle the high Doppler associated with the relative speeds of vehicles (up to 500 kph), allowing for improved accuracy of the path parameters at high vehicle speed.

In the following, it is assumed that each physical transmitter 4 is a base station (BS), and the respective virtual transmitter 4' is denoted virtual base station (VBS).

Figure 3:
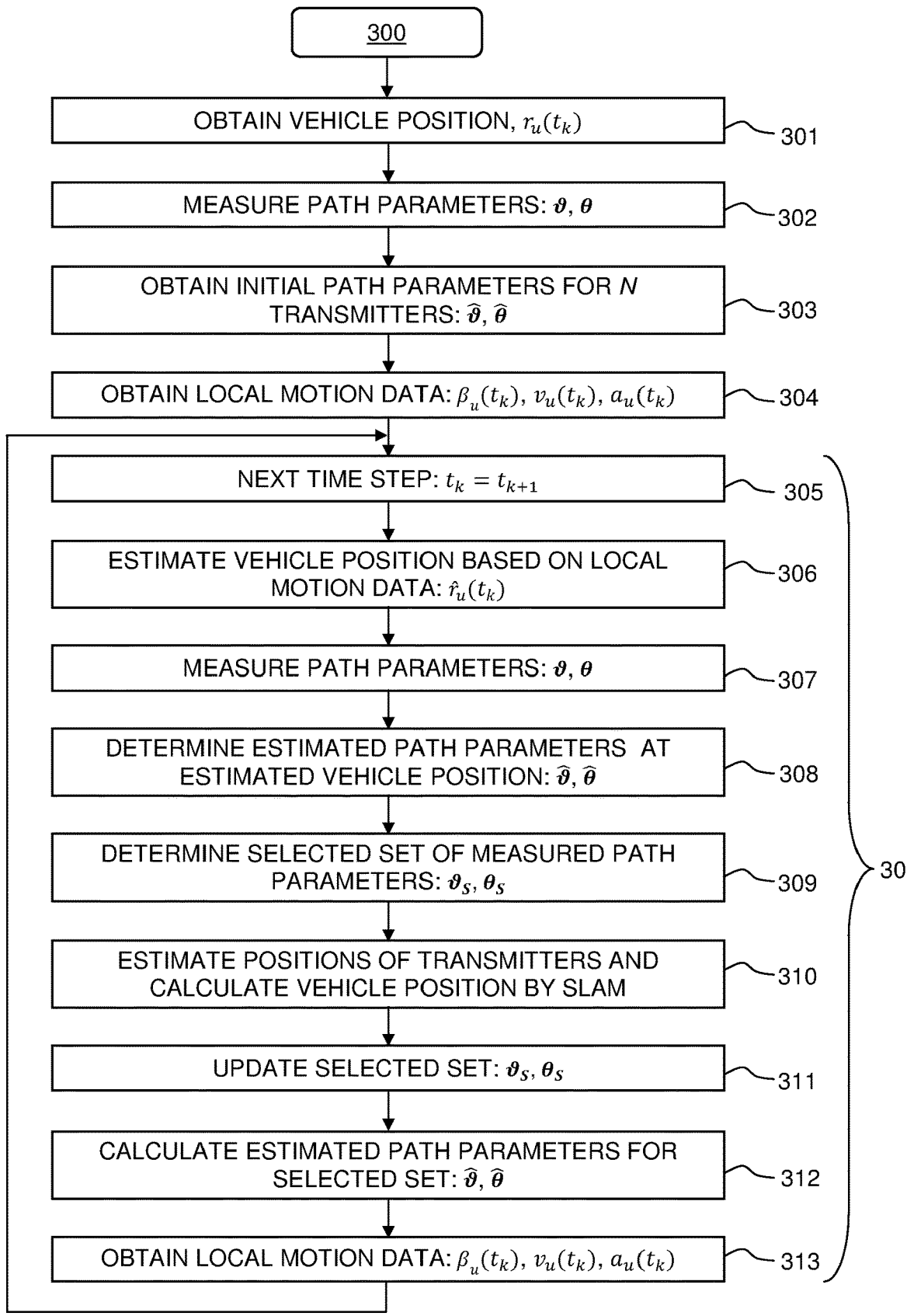
FIG. 3 is a flow chart of a method for positioning of a moving vehicle and surrounding transmitters in accordance with a first embodiment.

FIG. 3 is a flow chart of a positioning method 300 in accordance with a first embodiment and executed by a positioning device in the vehicle 1 as shown in FIGS. 1-2, for the purpose of tracking the vehicle position based on reference signals received from surrounding BSs. For each time step, the method 300 generates an output position that represents the current position of the vehicle, e.g. in the coordinate system (x,y) in FIG. 1. The output position may be e.g. be supplied for processing in an ITS application. The positioning method 300 may e.g. start when the positioning device loses connection to an external positioning system, such as a GNSS, or determines that the position data provided by such a system is unreliable. Alternatively, the positioning method may be executed to provide position data to supplement position data provided by the GNSS.

In the illustrated example, step 301 obtains the current position, $r_u(t_k)$, of the vehicle in an absolute coordinate system, e.g. coordinate system (x,y) in FIG. 1. The current position may e.g. be a position given by the external positioning system.

Step 302 operates the positioning device (e.g. an RF module 440, FIG. 4) to receive the reference signal(s) from one or more BSs 4 in the environment of the vehicle. Step 302 then processes the reference signal(s) to determine measured values of one or more path parameters for the MPCs impinging at the vehicle, for each BS 4 separately. Hence, it is assumed that the reference signals from the different BSs 4 are separated in frequency and/or time. Step 302 results in measured path parameters for M MPCs from all BSs 4 in the surroundings of the vehicle. In the illustrated example, the path parameters are time delay and AoA, and the measured values are represented as $\vartheta$, $\theta$, which may be vectors containing measured values of M MPCs (cf. [d1, θ1] etc in FIG. 2). There are a number of well-known algorithms that may be operated on the received reference signal to determine the path parameters, e.g. the Space-Alternating Generalized Expectation-Maximization (SAGE) algorithm, a Kalman Filter, an extended Kalman filter (EKF), one of existing Multiple Signal Classification (MUSIC) algorithms, e.g. root-MUSIC, a Kalman Enhanced Super Resolution Tracking (KEST) algorithm, etc. Determining the propagation length typically involves determining a time delay corresponding to a propagation time for the respective MPC from BS4 to vehicle 1, where the propagation length is obtained by multiplying the time delay with the speed of light. Thus, embodiments of the positioning method 300 may operate on either time delay or propagation length, which are considered to be equivalent path parameters. It should also be noted that the path parameters determined in step 302 may include further variables that may be used in embodiments of the method, e.g. the complex amplitude for the respective MPC.

Step 303 obtains initial values of path parameters for a predefined number N of MPCs. In the illustrated example, the path parameters are time delay and AoA, and the initial values are represented as $\hat{\vartheta}$, $\hat{\theta}$ which may be vectors containing initial values of N MPCs. Step 303 may involve selecting a set of N MPCs among the M MPCs identified in step 302, e.g. based on a quality parameter such as signal strength ("power") or SNR, and setting the initial values $\hat{\vartheta}$, $\hat{\theta}$ the measured values $\vartheta$, $\theta$ of the selected set of MPCs.

Step 304 acquires local motion data from a motion detector in the vehicle 1. The local motion data includes heading $\beta_u(t_k)$ and velocity $v_u(t_k)$, and preferably also acceleration $a_u(t_k)$.

After these initial steps 301-304, the method proceeds to repeatedly execute step sequence 30 in FIG. 3. Each execution of the step sequence 30 is associated with a respective time step forward in time (by step 305). Thus, as the vehicle 1 is moving along a trajectory (2 in FIG. 1), it will be in a new position at each such time step. The purpose of the step sequence 30 is to calculate the position of the vehicle 1 at each time step. As a side-effect, the step sequence 30 may also estimate the positions of the BSs 4 and VBSs 4', i.e. the position of origin for the respective MPC on an LOS path.

Step 306 computes an estimated vehicle position $\hat{r}_u(t_k)$ at the current time step $t_k$ based on the local motion data obtained in step 304, i.e. at the preceding time step $t_{k-1}$. The estimated vehicle position $\hat{r}_u(t_k)$ computed in step 306 may be used as input to both step 308 and step 310. It is currently believed that an improved accuracy of the estimated vehicle position $\hat{r}_u(t_k)$ computed by step 306 will result in a significant improvement in the accuracy of the output position as calculated by step 310 (below). To this end, it is preferable to calculate the estimated vehicle position $\hat{r}_u(t_k)$ as a function of heading, velocity and acceleration as obtained by step 304 at the preceding time step $t_{k-1}$, i.e. as a function of $\beta_u(t_{k-1})$, $v_u(t_{k-1})$ and $a_u(t_{k-1})$. For example, the estimated vehicle position may be given by:

$$\hat{r}_u(t_k) = r_u(t_{k-1}) + v_u(t_k) \cdot (t_k - t_{k-1}) + \frac{a_u(t_k)}{2} \cdot (t_k - t_{k-1})^2$$

where $r_u(t_{k-1})$ is a vehicle position determined in the preceding time step (e.g. by step 301, step 306 or step 310), $v_u(t_k)$ is given by $T \cdot v_u(t_{k-1})$, $a_u(t_k)$ is given by $T \cdot a_u(t_{k-1})$, where T is a 2-dimensional rotation matrix representing the heading $\beta_u$, as is readily understood by the skilled person. An example of a definition and use of the rotation matrix T is given in the above-mentioned article by Ulmschneider et al (2016).

Step 307 corresponds to step 302 and measures the path parameters $\vartheta$, $\theta$ for the MPCs impinging on the receiver at the current time step. Like 302, step 307 may result in path parameters for any number M of MPCs.

Step 308 generates estimated (predicted) path parameters $\hat{\vartheta}$, $\hat{\theta}$ for the current time step as a function of the estimated vehicle position $\hat{r}_u(t_k)$ generated by step 306. Step 308 may involve a straight-forward geometric correction of either $\hat{\vartheta}$, $\hat{\theta}$ or $\vartheta$, $\theta$, computed at time step $t_{k-1}$, based on the change in vehicle position between time steps $t_{k-1}$ and $t_k$. It is realized that the propagation length and angle to the respective transmitter 4, 4' will change deterministically for a given change in position of the vehicle with time, and that such a change may be computed based on the resulting change of geometry. The purpose of step 308 is to generate input data for step 309.

It should be understood that the method operates on measured path parameters for N transmitters 4, 4", i.e. N MPCs, when calculating the output position in step 310 (below). However, it is not unlikely that step 307 measures the path parameters ϑ, θ for a larger number of the MPCs. It is also to be understood that the number M of MPCs in step 307 may vary considerably over time, since it depends on the local surroundings of the vehicle, e.g. the structure, location and number of reflecting surfaces 3, and the number of physical transmitters 4. It is currently believed that a structured and optimized selection of N MPCs among the M MPCs identified in step 307 will result in a significant improvement in the accuracy of the output position as calculated by step 310 (below). Such a structured, automatic and optimized selection is performed by step 309, which selects measured path parameters for N MPCs among the measured path parameters for M MPCs identified in step 307 and allocates these measured path parameters to individual MPCs. In one embodiment, step 309 performs the allocation by finding a best match between the measured path parameters ϑ, θ for M MPCs from step 307 and the estimated path parameters $\hat{\vartheta}, \hat{\theta}$ for N MPCs from step 308, e.g. by use of any available algorithm for data association (DA). In one embodiment, step 309 comprises finding the subset of the measured path parameters ϑ, θ that yields the minimum sum of (absolute) differences when subtracted from the estimated path parameters $\hat{\vartheta}, \hat{\theta}$. Thus, step 309 outputs a selected set $\vartheta_S, \theta_S$ of measured path parameters ϑ, θ for N MPCs. Example algorithms for finding the selected set $\vartheta_S, \theta_S$ are e.g. described in the article "A Consistent Metric for Performance Evaluation of Multi-Object Filters", by Schuhmacher et al, published in *IEEE Trans. Signal Process.* vol. 56, no. 8, pp 3447-3457, 2008, and the article "Algorithms for the Assignment and Transportation Problems", by Munkres, published in *J. Soc. Indust. Appl. Math.* vol. 5, no. 1, 1957. In a variant, step 309 also uses the signal strength (power) of the MPCs to find the best match between the measured path parameters (from step 307) and the estimated path parameters (from step 308), e.g. by modifying the above-mentioned sum of differences to also include differences between the signal strengths of the measured path parameters (i.e. the signal strengths of the corresponding MPCs) and the signal strengths of the estimated path parameters (e.g. given by the signal strength of the corresponding MPCs that were measured at one or more preceding time steps).

Step 310 estimates the positions of the transmitters 4, 4' for the N MPCs and calculates an output position that represents the current position of the vehicle, by operating any implementation of the well-known Simultaneous Localization And Mapping (SLAM) algorithm on the estimated vehicle position $\hat{r}_u(t_k)$ computed in step 306 at the current time, and possibly during one or more preceding time steps, as well as the selected set $\vartheta_S, \theta_S$ extracted in step 309, and optionally velocity data and/or acceleration data given by the local motion data in step 304. In certain implementations, the SLAM algorithm may generate a 2-dimensional probability function for the location of the respective transmitter 4, 4'. In one embodiment, the SLAM algorithm is Bayesian feature-based SLAM, e.g. a Rao-Blackwellization Particle Filter, which is well-known to the skilled person.

Step 311 evaluates the MPCs to be included in the selected set $\vartheta_S, \theta_S$. Thereby, step 311 may replace one MPC for another MPC, add an MPC or remove an MPC. Thus, by step 311, the predefined number N may be changed. In one embodiment, a limit value $N_{max}$ is set to define the maximum number of MPCs to be included in the selected set. Step 311 is designed to include, in the selected set $\vartheta_S, \theta_S$, the MPCs that are deemed to be most reliable at the respective time instant. For example, step 311 may evaluate all MPCs identified by step 307 with respect to one or more quality parameters (e.g. power, SNR, etc) and/or duration. For example, if a non-allocated MPC is found to persist for a sufficient number of time steps and if the signal strength of the MPC exceeds a predefined threshold, step 311 may add the measured value of the MPC to the selected set $\vartheta_S, \theta_S$. For example, if an allocated MPC is found to be unreliable, step 311 may remove the MPC from the selected set $\vartheta_S, \theta_S$. It is currently believed that step 311 may improve the accuracy of the output position calculated by step 310 and reduce computational complexity, by selectively selecting the most reliable or significant MPCs to be used for calculating the output position.

In a variant, step 311 is performed before step 310, which thereby operates on the measured values in the selected set $\vartheta_S, \theta_S$ as updated by step 311.

Step 312 calculates estimated path parameters $\hat{\vartheta}, \hat{\theta}$ for the MPCs in the selected set based on the estimated positions of the transmitters 4, 4' and the vehicle position generated by step 310. The estimated path parameters $\hat{\vartheta}, \hat{\theta}$ will then be used by step 308 at the next time step.

The method 300 then performs step 304 to acquire local motion data from the motion detector at the current time step and proceeds to step 305 for execution at the next time step.

Figure 4:
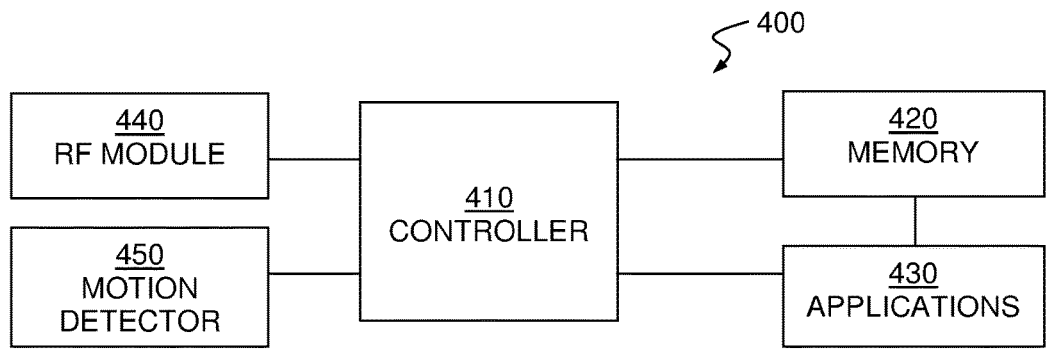
FIG. 4 is a block diagram of a positioning device in a vehicle.

FIG. 4 is a schematic view of the general structure of a positioning device 400 for executing the method 300 of FIG. 3. The positioning device 400 comprises a controller 410 which is responsible for the overall operation of the device 400 and may be implemented by any commercially available CPU ("Central Processing Unit"), DSP ("Digital Signal Processor") or another electronic programmable logic device. The controller 410 may be implemented using instructions that enable hardware functionality, for example, by using executable computer program instructions in a general-purpose or special-purpose processor that may be stored on a computer readable storage medium (disk, memory etc) 420 to be executed by such a processor. The controller 410 is configured to read instructions from the memory 420 and execute these instructions to control the operation of the device 400. The memory 420 may be implemented using any commonly known technology for computer-readable memories such as ROM, RAM, SRAM, DRAM, CMOS, FLASH, DDR, SDRAM or some other memory technology. The memory 420 is used for various purposes by the controller 410, one of them being for storing application data and program instructions 430 for one or more software modules in the device 400. The software modules may include a real-time operating system, an application handler as well as various applications 430. The applications are sets of instructions that when executed by the controller 410 control the operation of the device 400. The applications 430 may include a positioning application that implements the method of FIG. 3. The device 400 further comprises a radio frequency (RF) module 440, which is adapted to allow the device 400 to communicate via a radio frequency band through the use of one or more radio frequency technologies. Examples of such technologies are W-CDMA, GSM, UTRA, LTE, NMT, 5G etc, which may allow the controller 410 to receive the above-mentioned reference signals from the BSs 4. Other examples of such technologies are DSRC (Dedicated Short-Range Communications), e.g. IEEE 802.11p, which may allow the controller 410 to communicate with controllers in other vehicles. It is understood that the RF module 440 includes one or more antennas or antenna arrays. The station further comprises a motion detector 450, e.g. an inertial measurement unit (IMU), which may include a two- or three-dimensional accelerometer configured to detect acceleration and velocity of the device 400, and thus the vehicle 1. The motion detector 405 may, e.g., also comprise a magnetometer and/or a gyrometer for detecting rotation (heading) of the device 400. Alternatively, the motion detector 410 may be based on any other available technology for relative or absolute positioning, including but not limited to odometers, laser-based or ultrasonic rangefinders, and camera-based positioners.

Figure 5A:
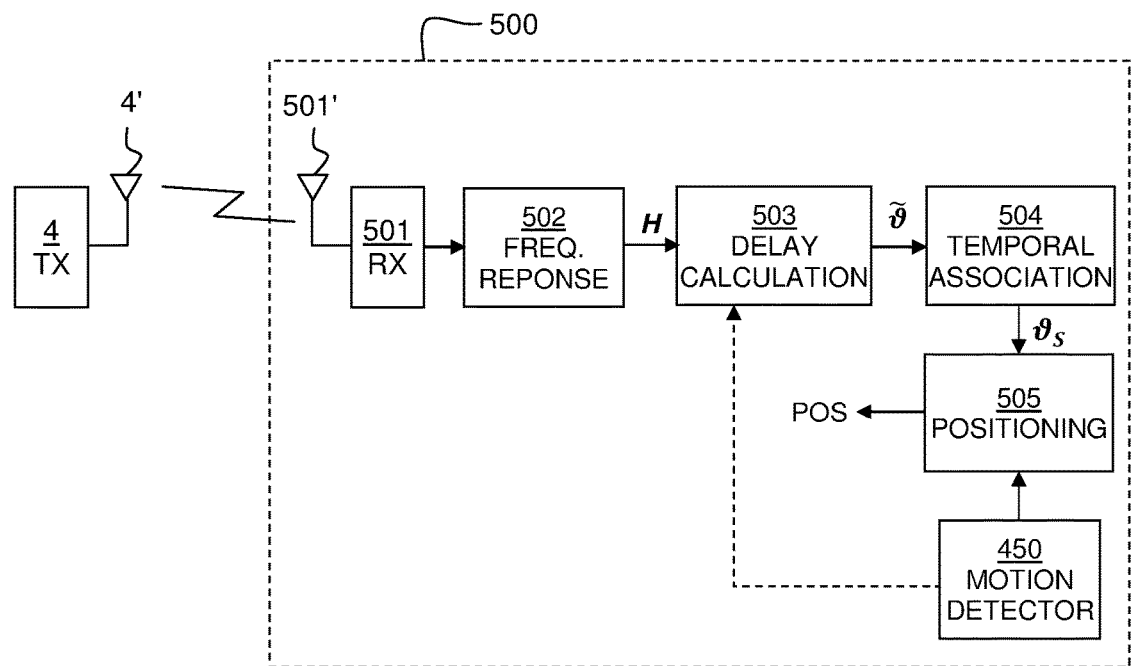
FIGS. 5A-5B are block diagrams of a system for positioning in accordance with a second embodiment.

In the following, a second embodiment of a self-positioning method for a vehicle based on reference signals received from surrounding BSs will be described with reference to FIGS. 5-10. The description with reference to FIGS. 1-2 above is equally applicable to the second embodiment. One difference compared to the positioning method 300 in FIG. 3 is that the determination and selection of MPCs and thus the determination of path parameters is separated from the positioning. FIG. 5A is a block diagram of a device 500 for implementing the self-positioning method according to the second embodiment. It should be understood that the device 500 may be configured as described above with reference to FIG. 4. Thus, the different blocks or modules of the device 500 may correspond to or be implemented by one or more of the blocks or modules in the device 400.

In FIG. 5A, the device 500 is shown to receive reference signals from one or more BSs 4, here represented by a transmitter, TX, with at least one antenna 4' (one shown). The device 500 comprises a receiver module, RX 501 with at least one antenna 501' (one shown), and a module 502 for receiving and processing a reference signal from RX 501 for determination of a current frequency response (FR), represented by a frequency response vector H in FIG. 5A. The device 500 further comprises a module 503 for processing the frequency response vector H for calculation of a current set of path parameter values, which in the present example consist of time delays (or equivalently, propagation lengths), represented by a delay vector $\hat{\vartheta}$ in FIG. 5A. A temporal association module 504 is configured perform a structured and optimized selection of delay values from the delay vector $\hat{\vartheta}$. Specifically, the module 504 is configured to evaluate the delay values in the delay vector $\hat{\vartheta}$ for temporal associations to previously determined delay values. Thus, module 504 may be seen to track MPCs over time, detect when an MPC disappears, and possibly reappears, and detect when a new MPC appears. Thereby, module 504 contributes to improve the quality and relevance of the delay values that are used for positioning. Module 504 outputs a delay vector $\vartheta_S$ which contains selected delay values at a current time point, corresponds to the "selected set" of the first embodiment and is denoted "selected vector" in the following. A positioning module 505 is configured to estimate, by use of a SLAM algorithm (see above), the positions of the BSs 4 corresponding to the delay values in the selected vector $\vartheta_S$ and calculate an output position POS that represents the current position of the device 500 and thus the vehicle. As indicated in FIG. 5A, the positioning module 505 may also obtain and process local motion data from the motion detector 450. FIG. 5A also indicates that local motion data may be obtained by module 503 and used for calculation of the delay vector $\hat{\vartheta}$, as will be described further below.

Figure 5B:
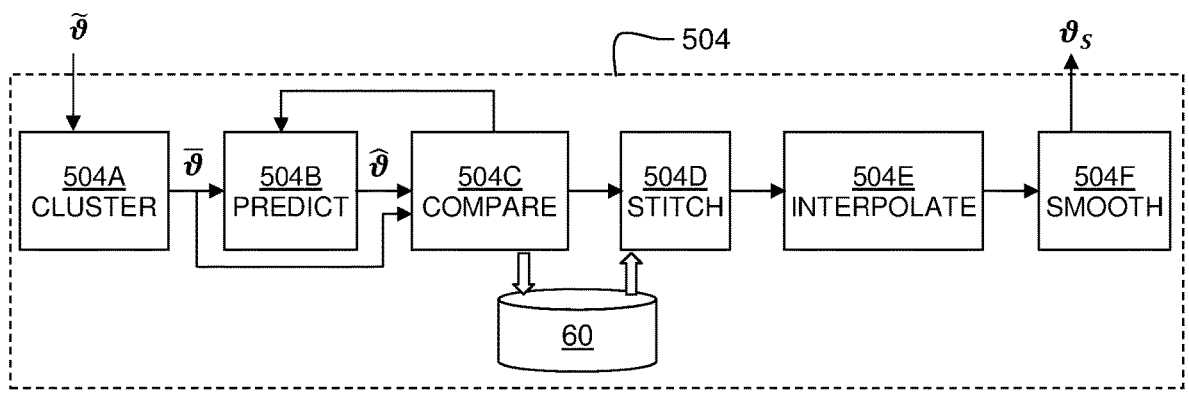

FIG. 5B shows an example implementation of the temporal association module 504 in FIG. 5A, with the module 504 comprising a number of sub-modules. A clustering sub-module 504A is configured to perform a clustering operation of delay values in multiple delay vectors $\hat{\vartheta}$ for the purpose of averaging. Thereby, the clustering sub-module 504A may improve the quality of the delay values and outputs a delay vector $\overline{\vartheta}$ that may contain at least some delay values obtained by averaging. A prediction sub-module 504B is configured to operate to generate a predicted delay vector $\hat{\vartheta}$ containing predicted delay values at the current time, where the sub-module 504B is updated based on delay vector $\overline{\vartheta}$. A comparison sub-module 504C is configured to compare the delay values in the predicted delay vector $\hat{\vartheta}$ and the delay vector $\overline{\vartheta}$ for the purpose of identifying associations between consecutive delay values, as well as to identify when an existing MPC disappears or when a new MPC appears and update sub-module 504B accordingly. Further, the comparison sub-module 504C is configured to buffer time sequences of delay values in a data structure 60, which is continuously updated to hold the most recent delay values over a time period. Each such time sequence contains delay values for one MPC. Thus, the data structure 60 is continuously updated to contain coherent time sequences of associated delay values, including terminated and new time sequences. A stitching sub-module 504D is configured to analyze any new time sequence for a possible connection to a previously terminated time sequence. An interpolation sub-module 504E is configured to add one or more delay values, in correspondence with the time resolution of delay values, to fill in a connection detected by sub-module 504D between a terminated sequence and a new sequence. Thereby, sub-modules 504D-504E serve to increase the number of useful delay values and thereby improve the quality of the output position POS. To further improve the quality of the delay values, a smoothing sub-module 504F is configured to operate a smoothing function on the time sequences of delay values, e.g. by fitting a polynomial function of predefined order to the respective time sequence and replacing the time sequence of delay values by the time sequence of fitted delay values. The smoothing sub-module 504F is configured to output a selected vector $\vartheta_S$ which contains the delay values of existing time sequences at the current time, i.e. one delay value from each time sequence.

The functionality of the modules and sub-modules in FIGS. 5A-5B will be further explained with reference to flow charts in FIGS. 6A-6B which show a positioning method 300' in accordance with the second embodiment. The positioning method 300', shown in FIG. 6B, obtains current values of path parameters from an estimation method 600, shown in FIG. 6A. The estimation method 600 comprises a step 601A of operating the receiver 501 (e.g. included in the RF module 440, FIG. 4) to receive reference signal(s) from one or more BSs 4, a step 601B performed by module 502, steps 602-608 performed by module 503, and steps 609-615 performed by module 504. The positioning method 300' is performed by module 505 (FIG. 5A).

The following description of the estimation method 600 in FIG. 6A will be made with reference to algorithms disclosed in the article "Vehicular Position Tracking Using LTE Signals", by Driusso et al, published in *IEEE Transactions on Vehicular Technology*, Vol. 66, No. 4, 2017, pp 3376-3391, which is incorporated herein in its entirety. The article is directed to a technique of positioning a vehicle based on time delays for direct paths (DP) between base stations and a receiver on the vehicle, where the DPs correspond to the LOS paths p1 in FIGS. 1-2. Specifically, Driusso et al propose a super-resolution (SR) algorithm which is adapted to mitigate the effects of multipath on DP time-of-arrival values that are determined based on an LTE CRS signal. In other words, the aim of the SR algorithm is to eliminate the effects of reflected signals. However, the SR algorithm proposed by Driusso et al is also capable of determining all MPCs and the method 600 in FIG. 6A may be seen as a development and improvement of this SR algorithm in the context of positioning based on MPCs.

Figure 6A:
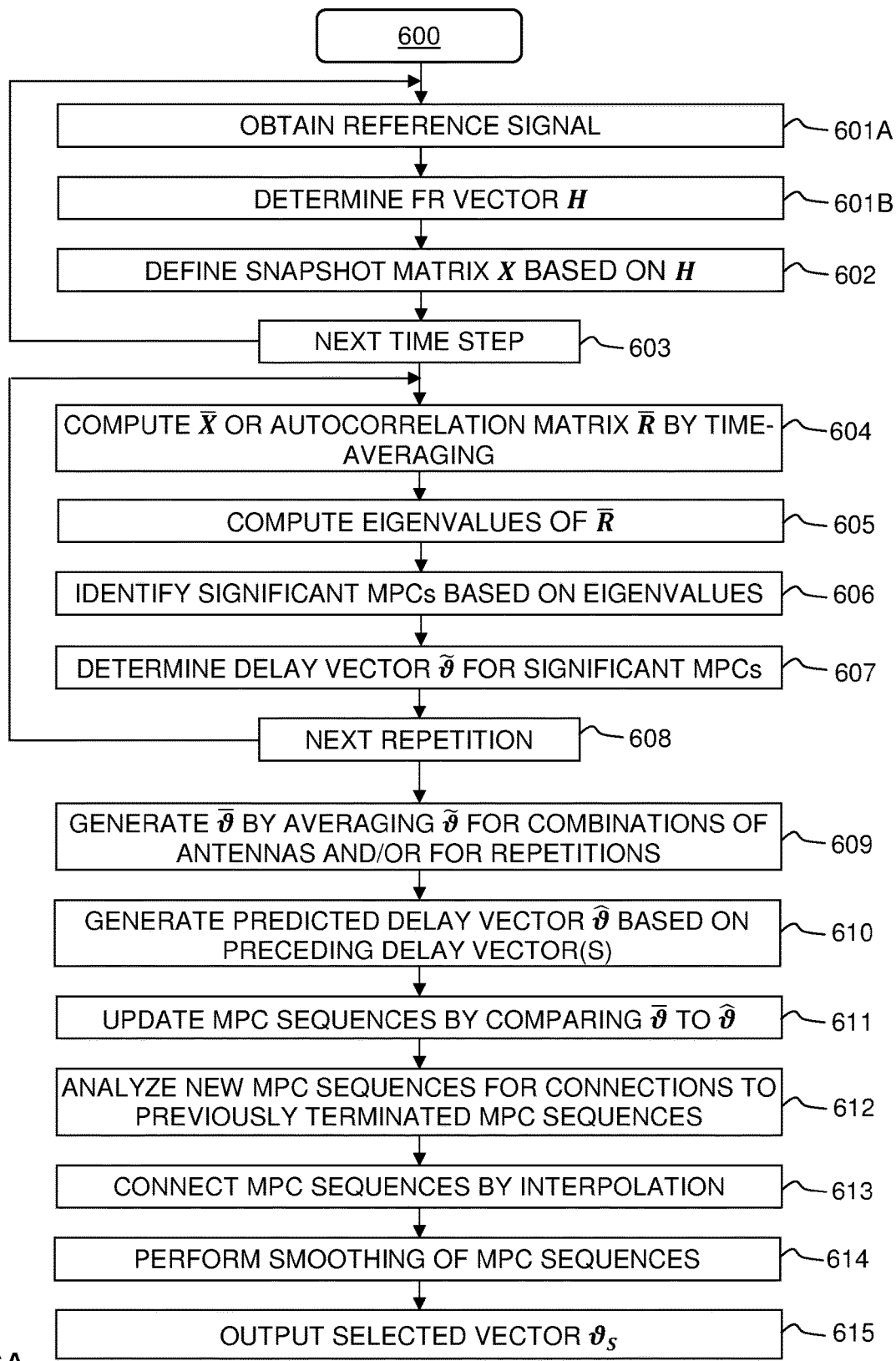
FIGS. 6A-6B are flow charts of methods in accordance with the second embodiment.

As indicated in FIG. 6A, steps 601A-603 are performed repeatedly to generate a time sequence of snapshot matrices X (see below). Likewise, steps 604-608 are performed repeatedly to operate on a respective set of snapshot matrices X from steps 601A-603 to generate a time sequence of delay vectors $\tilde{\vartheta}$. Steps 609-615 then operate on one or more of the delay vectors $\tilde{\vartheta}$ to generate and output a selected vector $\vartheta_S$ for a current time point Like in the first embodiment, the method 600 may process reference signals from different BSs 4 and output one or more selected vectors $\vartheta_S$. Reverting to FIG. 5A, it is realized that the output rate of selected vectors $\vartheta_S$ define the time resolution of the output positions POS generated by the positioning module 505. Step 601B determines a frequency response (FR) vector H based on the reference signal received by the receiver 501 (FIG. 5A). The term "frequency response" is given its ordinary meaning and is well-known to the person skilled in the art. In a short observation window, the multipath channel encountered by a signal propagating from the BS 4 to the receiver 501 may be modeled with the following frequency channel impulse response (CIR) and channel frequency response (CFR):

$$h(\tau) = \sum_{l=0}^{L-1} h_l \delta(\tau - \tau_l) \stackrel{F}{\Rightarrow} H(f) = \sum_{l=0}^{L-1} h_l e^{-j2\pi f \tau_l}$$

where $\delta$ denotes the Dirac delta function, $h_l$ is the complex channel gain associated with the lth path, F is a Fourier transformation, and $\tau_l$ is the corresponding time delay with $\tau_0 < \ldots < \tau_{L-1}$.

Figure 7A:
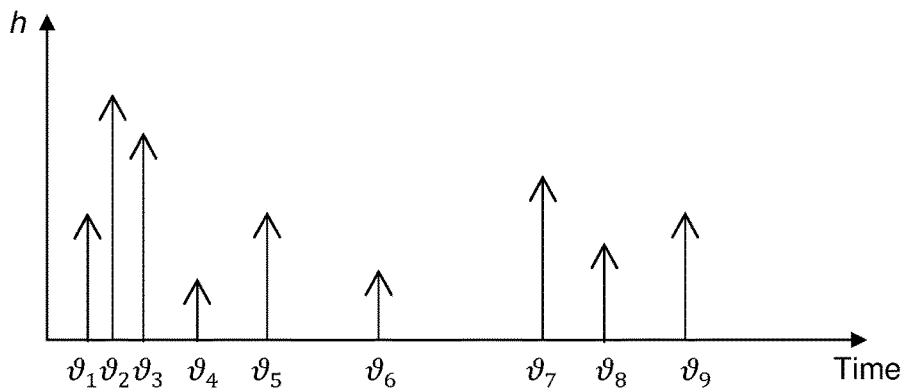
FIGS. 7A-7B are generic plots of signals used in the method in FIG. 6A.
Figure 7B:
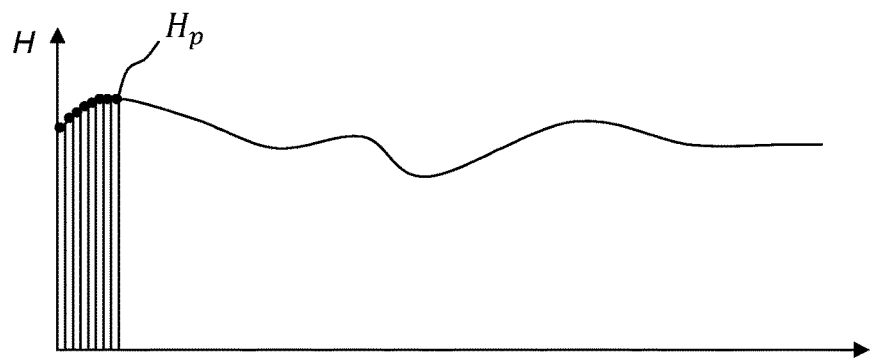

As a general illustration, consider an idealized signal h(t) comprising a sequence of impulses at different time delays $\vartheta_1, \ldots, \vartheta_9$ as shown in FIG. 7A. After Fourier transformation, this signal results in a frequency response signal H(f) in the frequency domain. Given that the reference signal is divided into sub-signals at different frequencies (sub-carriers), the signal H(f) may be represented as complex data samples $H_p$, indicated by dots in FIG. 7B. It may be noted that the reference signal as received by the receiver 501 also comprises noise and other signal artefacts that makes it difficult to determine the time delays from the time domain signal h(t). Therefore, e.g. as described by Driusso et al (2017), the reference signal may be processed into an FR vector H comprising complex data samples $H_p$. Step 602 defines a matrix X, also denoted "snapshot matrix" herein, by arranging different subsets of the FR vector H as columns in the snapshot matrix X. Each column thereby forms a different snapshot of the complex data samples $H_p$ in the FR vector H. In the example given in Driusso et al (2017, the snapshots are displaced by one sample $H_p$ in H between adjacent columns in X. Other definitions of the snapshot matrix X are conceivable.

As indicated by step 603, the method 600 repeatedly executes steps 601A-602 to generate a time sequence of snapshot matrices X. Step 604 receives the time sequence of snapshot matrices X generated by step 602 and performs an element-wise time averaging of a number n of consecutive snapshot matrices X to generate an average snapshot matrix: $\overline{X} = \Sigma_{i=0}^{n-1}$, optionally normalized by n. The subsequent processing of the snapshot matrix is non-linear and involves finding eigenvalues and is thus sensitive to noise and other variations. Step 604 improves the quality of the snapshot matrix X. The number n may be predefined and set in view of the generation rate of FR vectors H and a maximum speed of the vehicle. For example, for a maximum speed of 20 m/s, the position of the vehicle will change less than 0.2 m during 10 ms, which corresponds to n=40 with a generation rate of 4 kHz. In a variant, the number n is set based on the current vehicle speed, given by the motion detector 450 (FIG. 5A). Thereby, the number will be increased at lower vehicle speeds, resulting in an improved quality of $\overline{X}$. This may be especially advantageous since the required accuracy of the vehicle position POS may be higher in urban environments where the vehicle speed is lower.

Step 605 computes the eigenvalues a of the autocorrelation matrix of $\overline{X}$: $\overline{R} = \overline{X} \cdot \overline{X}^*$, where * indicates the conjugate transpose. This may be achieved by singular value decomposition (SVD) of $\overline{X}$, as is well-known to the skilled person: $\overline{X} = U \cdot \Sigma \cdot V^H$, with U and V being unitary matrices and E being a diagonal matrix with the singular values $\sigma_1 \geq \ldots \geq \sigma_M$ in the main diagonal, where the eigenvalues of $\overline{R}$ are given by the square of the respective singular value. Other well-known techniques may be utilized to determine the eigenvalues of $\overline{R}$. In a variant, step 605 first computes the autocorrelation matrix $\overline{R}$ (e.g. as $\overline{R} = \overline{X} \cdot \overline{X}^*$) and then computes the eigenvalues $\sigma_m^2$ by eigenvalue decomposition of $\overline{R}$.

In an alternative implementation, the autocorrelation matrix may be computed as $\overline{R} = \Sigma_{i=0}^{n-1} X \cdot X^*$, optionally normalized by n. In this alternative, step 602 may be modified to compute and output $R = X \cdot X^*$ instead of X. Thus, steps 601A-602 may be repeatedly executed to generate a time sequence of autocorrelation matrices R, which are then averaged by step 604. It has been found that this alternative has a better ability to increase SNR when the channel between transmitter 4 and receiver 501 is relatively stable. On the other hand, computation of $\overline{R} = \overline{X} \cdot \overline{X}^*$ is less sensitive to changes in the channel. In one embodiment, the method 600 is operable to switch between computing $\overline{R} = \overline{X} \cdot \overline{X}^*$ and $\overline{R} = \Sigma_{i=0}^{n-1} X \cdot X^*$ depending on the current stability of the channel, which may be estimated by any suitable stability parameter known in the art.

Step 606 computes values of one or more quality parameters based on the eigenvalues and evaluates the quality parameter values to identify significant MPCs. Step 606 is based on the fact that the eigenvalues generated by step 607 represent the signal power of potential MPCs in the reference signal as received by the receiver 501. Thus, the eigenvalues may be seen to represent the strength of the respective arrow in FIG. 7A. Although step 606 may identify a predefined (fixed) number of MPCs, e.g. corresponding to the largest eigenvalues, it is preferable that the identification of MPCs is dynamic so as to allow the number of identified MPCs to vary over time. Such a dynamic identification will improve the performance of the temporal association performed by subsequent steps 609-615. In a first embodiment of dynamic identification, the quality parameter is computed as the difference between the largest eigenvalue and the respective eigenvalue, and step 606 identifies an MPC as significant if the quality parameter value is below a first threshold TH1. The first threshold TH1 may be predefined or set as a function of estimated noise power. The noise power may be estimated based on the eigenvalues. To the extent that the number of eigenvalues is larger than the largest possible number of MPCs, the smallest eigenvalues represent noise components in the reference signal. The number of eigenvalues corresponds to the length of the subsets in the snapshot matrix X, i.e. the number of elements in the columns of X. Thus, by ensuring that the number of eigenvalues exceeds the maximum number of MPCs, a subset of the smallest eigenvalues may be averaged for estimation of the noise power. In one example, assuming that the maximum number of MPCs is 20 and that the number of eigenvalues is 60, the 20-40 smallest eigenvalues may be averaged to estimate the noise power. In a second embodiment of dynamic identification, the quality parameter is computed to represent a ratio of the respective eigenvalue and the noise power, and step 606 identifies an MPC as significant if the quality parameter is above a second threshold TH2, which may be predefined. This is equivalent to estimating the signal-to-noise ratio (SNR) for each MPC and comparing it to an SNR threshold.

In step 606, the feature of estimating the noise power and using the noise power for identifying significant MPCs is advantageous in that it mitigates the risk of identifying noise components as significant MPCs.

In step 607, the time delay values for the significant MPCs are calculated (cf. $\vartheta_1, \ldots \vartheta_9$ in FIG. 7A) according to any available technique. In one non-limiting example, which capitalizes on the SVD performed in step 605, a classical ESPRIT approach is utilized to process the U matrix into a $\Psi$ matrix, compute the eigenvalues $\Psi_m$ of the $\Psi$ matrix, and compute the time delay values as a function of the eigenvalues $\Psi_m$, e.g. as described in Driusso et al (2017). Step 607 then outputs a delay vector $\tilde{\vartheta}$ containing the delay values.

As indicated by step 608, the method 600 may repeatedly execute steps 604-607 to generate a time sequence of delay vectors $\tilde{\vartheta}$. If so, step 609 receives the time sequence of delay vectors $\tilde{\vartheta}$ generated by step 607 and generate an average delay vector $\overline{\vartheta}$ as a function of the delay vectors $\tilde{\vartheta}$. In a simple example, the average delay vector $\overline{\vartheta}$ may be generated by element-wise time averaging of a number s of consecutive delay vectors $\tilde{\vartheta}$: $\overline{\vartheta}=\Sigma_{i=0}^{s-1}\tilde{\vartheta}$, optionally normalized by s. The number s may be set based on the same considerations as the number n in step 604. The averaging will improve the quality of delay values that are passed on for processing by subsequent steps. It is realized that there is a trade-off between the averaging performed to determine $\overline{R}$ (by step 604) and the averaging to determine $\overline{\vartheta}$ (by step 609), which may be determined by testing. It is currently believed that the combination of two averaging processes provides a significant improvement in the quality of the delay values that are provided to the positioning method 300' (FIG. 6B).

Alternatively or additionally, presuming that the receiver 501 and/or the BS transmitter 4 comprises more than one antenna 501', 4', step 609 may perform averaging of delay vectors $\tilde{\vartheta}$ that are generated based on the reference signal as transmitted between different pairs of antennas (and received by step 601A). Thus, provided that the receiver 501 is operable to separate the incoming reference signals into instances transmitted between different pairs of antennas, steps 601A-609 may be performed in parallel or in sequence for each of the instances to generate a respective sequence of delay vectors $\tilde{\vartheta}$. The distance between antennas on a BS 4 or a positioning device 500 is generally small compared to vehicle movement and time variations in the delay values, and thus the processing of the different instances of the reference signal should result similar delay values, which may thus be averaged for improved quality.

Figure 8:
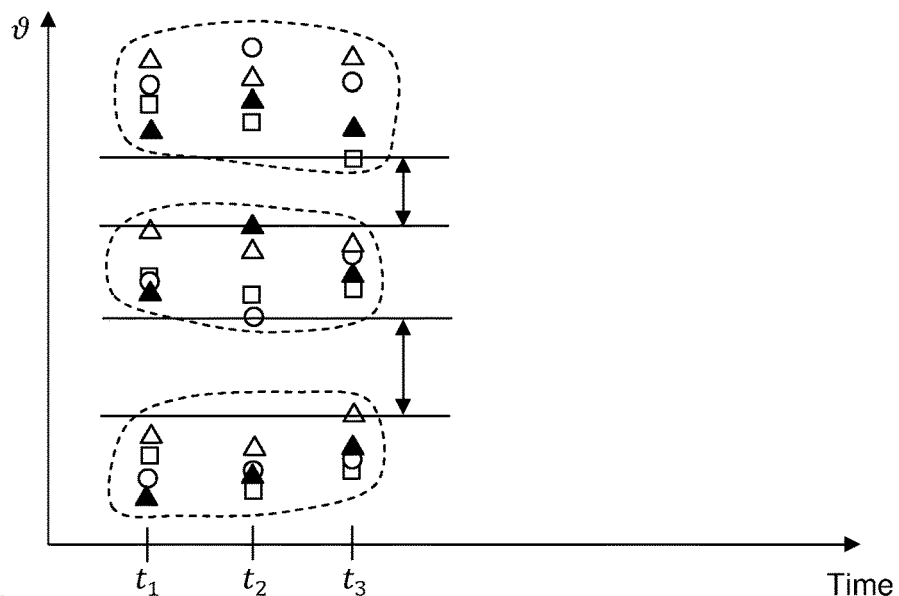
FIG. 8 illustrates clustering performed by the method in FIG. 6A.

FIG. 8 shows a plot of delay values obtained from different antenna pairs at three time instances $t_1, t_2, t_3$, where the delay values from different antenna pairs are represented by different symbols (open circle, open square, open triangle, filled triangle). The skilled person understands that there are many different ways of implementing the averaging over antennas and/or time. In one non-limiting implementation example, step 609 groups the delay values into clusters (indicated by dashed lines in FIG. 8) and computes a cluster value for the respective cluster, e.g. as an average (centroid) of the included delay values. It is also conceivable that step 609, before computing the cluster values, eliminates all clusters that contain a small number of delay values, i.e. a number beneath a predefined number limit. Such post-processing may serve to reduce the impact of spurious delay values. The respective cluster value is then entered as a delay value in the delay vector $\overline{\vartheta}$. Any conceivable clustering algorithm may be used.

Generally step 609 may thus be seen to perform an averaging of measured values over time and/or over different antenna pairs, by grouping measured values into clusters, computing cluster values for at least a subset of the clusters as a function of the measured values in the respective cluster, and arranging the cluster values as measured values in the average delay vector $\overline{\vartheta}$.

Reverting to the method 600 in FIG. 6A, steps 610-614 aim at performing a temporal association, if possible, between consecutive delay values to define time sequences of delay values (also denoted "MPC sequences" herein) that correspond to (follow) the movement (trajectory) of the vehicle (cf. 2 in FIG. 1). Step 610 generates a predicted delay vector $\hat{\vartheta}$ at the current time based on one or more preceding delay vectors $\overline{\vartheta}$. Step 610 may operate any suitable prediction algorithm. In a non-limiting example, conventional Kalman filtering is used. Kalman filters are well-known to the skilled person and a detailed implementation example is e.g. given in Driusso et al (2017). For example, the Kalman filter may linear and predict the current time delay by $\vartheta_c^{(n)}=\Phi\vartheta_c^{(n-1)}+w^{(n)}$, where $w^{(n)}$ denotes the state noise with covariance matrix Q, and $\Phi$ is the state transition matrix given by:

$$\Phi = \begin{bmatrix} 1 & 1 \\ 0 & 1 \end{bmatrix}$$

$$u_c^{(n)} = J\vartheta_c^{(n)} + v^{(n)}$$

where $u_c^{(n)}$ describes the observed delay value, i.e. J=[1 0], and $v^{(n)}$ denotes the observation noise with covariance matrix L. Based on these definitions, the Kalman filter may be operated with the following equations for prediction:

$$\vartheta_c^{(n|n-1)}=\Phi\vartheta_c^{(n-1)}$$

$$M^{(n|n-1)}=\Phi M^{(n-1|n-1)}\Phi^T+Q$$

and the following equations for update:

$$K^{(n|n)}=M^{(n|n-1)}J^T(JM^{(n|n-1)}J^T+L)^{-1}$$

$$\vartheta_c^{(n|n)}=\vartheta_c^{(n|n-1)}+K^{(n|n)}(u_c-j\vartheta_c^{(n|n-1)})$$

$$M^{(n|n-1(}=(I-K^{(n|n)}J)M^{(n|n-1)}$$

Figure 9:
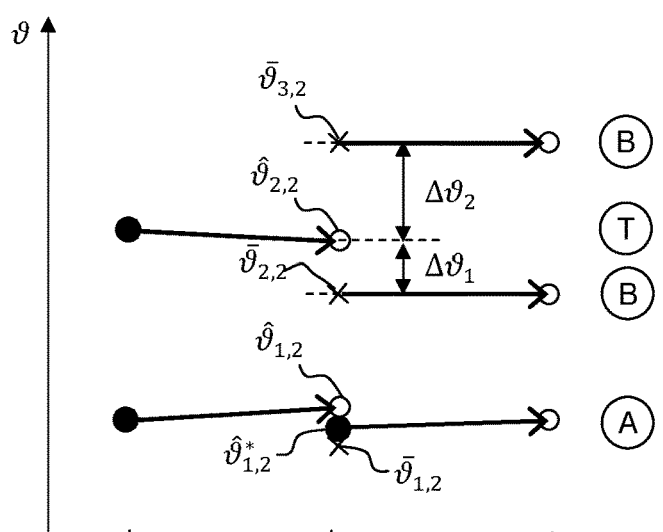
FIG. 9 illustrates prediction and association performed by the method in FIG. 6A.

FIG. 9 is a simplified plot that exemplifies the prediction by step 610 at three instances $t_1, t_2, t_3$. In FIG. 9, open circles represent predictions, filled circles represent corrected predictions (below), and crosses represent measured delay values (in $\overline{\vartheta}$ from step 609), and the arrows indicate a prediction. In the illustrated example, the Kalman filter operates to generate predicted delay values $\hat{\vartheta}_{1,2}$ and $\hat{\vartheta}_{2,2}$ at time $t_2$.

Step 611 compares each of the predicted delay values $\hat{\vartheta}_{1,2}$, $\hat{\vartheta}_{2,2}$ at time $t_2$ to the measured delay values $\bar{\vartheta}_{1,2}$, $\bar{\vartheta}_{2,2}$, $\bar{\vartheta}_{2,3}$ at time $t_2$ to determine the nearest neighbor to each predicted delay value $\hat{\vartheta}_{1,2}$, $\hat{\vartheta}_{2,2}$ among the measured delay values $\bar{\vartheta}_{1,2}$, $\bar{\vartheta}_{2,2}$, $\bar{\vartheta}_{3,2}$, and the nearest neighbor to each measured delay value $\bar{\vartheta}_{1,2}$, $\bar{\vartheta}_{2,2}$, $\bar{\vartheta}_{3,2}$ among the predicted delay values $\hat{\vartheta}_{1,2}$, $\hat{\vartheta}_{2,2}$.

If the difference (in delay time) to the nearest neighbor is below a threshold, which may be predefined, step 611 designates an association between the predicted and measured delay values, computes a corrected prediction (as a function of the predicted and measured delay values), updates the Kalman filter with the corrected prediction, and adds the measured delay value to a data structure 60 (FIG. 5B) that stores measured delay values for existing and terminated MPC sequences. Thereby, the measured delay value is stored as part of an MPC sequence in the data structure 60. This procedure is exemplified at the bottom of the plot in FIG. 9, where the encircled A indicates that step 611 has identified an association between $\hat{\vartheta}_{1,2}$ and $\bar{\vartheta}_{1,2}$, and computed an updated prediction $\hat{\vartheta}^*_{1,2}$, e.g. as a (weighted) average of $\hat{\vartheta}_{1,2}$ and $\bar{\vartheta}_{1,2}$. The association implies that the measured delay value $\bar{\vartheta}_{1,2}$ belongs to an existing MPC sequence, and $\bar{\vartheta}_{1,2}$ is thus added to the related MPC sequence in the data structure 60.

If the difference to the nearest neighbor from a predicted delay value exceeds the threshold, step 611 designates a termination of an MPC sequence, and removes the predicted delay value from the Kalman filter. No delay value is added to the data structure 60. This procedure is exemplified in FIG. 9, where the encircled T indicates that step 611 has designated a termination of the MPC sequence corresponding to the measured delay value $\hat{\vartheta}_{2,2}$ since the distance $\Delta\vartheta_1$ to the nearest neighbor exceeds the threshold.

If the difference to the nearest neighbor from a measured delay value exceeds the threshold, step 611 designates a birth of a new MPC sequence, adds the predicted delay value to the Kalman filter, and adds the measured delay value as included in a new MPC sequence in the data structure 60. This is exemplified in FIG. 9, where the encircled B indicates that step 611 has identified a birth of new MPC sequences for the measured delay values $\hat{\vartheta}_{2,2}$ and $\hat{\vartheta}_{3,2}$, respectively, since the since their distances $\Delta\vartheta_1$, $\Delta\vartheta_2$ to their nearest neighbors exceed the threshold.

The foregoing description of step 611 is given as a non-limiting example. More advanced data association algorithms may be utilized for evaluating potential associations between consecutive delay values, e.g. assignment algorithms such as the Hungarian algorithm, probabilistic data association, etc.

In a variant, steps 610-611 also account for the power associated with the respective measured delay value (e.g. given by the eigenvalues determined in step 605) when identifying associations, terminations and births. As understood by the skilled person, the above-described Kalman filter may be readily modified to also generate predictions of power.

From the foregoing, it is clear that steps 610-611 operate on current delay values, generated by step 609, to update the data structure 60 with current delay values of existing MPC sequences and current delay values for any new MPC sequences that may emerge, while also refraining from adding any delay values to existing MPC sequences that are found to be terminated.

Step 612 operates on the data structure 60 to analyze new MPC sequences for possible connections to previously terminated MPC sequences. Specifically, step 612 applies a set of rules to determine if a new MPC sequence and a previously terminated MPC sequence are likely to correspond to the same MPC. The rules may be given as a function of difference in delay values and/or time and/or power between end points and starting points of terminated and new MPC sequences, respectively. Step 612 may thereby be seen to join or "stitch" discontinuous MPC sequences. Step 612 may apply a time limit that defines the maximum time difference between the end of a terminated MPC sequence and the start of a new MPC sequence. Such a time limit may, e.g., be in the range of 0.1-5 seconds or 0.5-2 seconds. The data structure 60 may be automatically cleared of delay values that are older than the time limit.

Figure 10A:
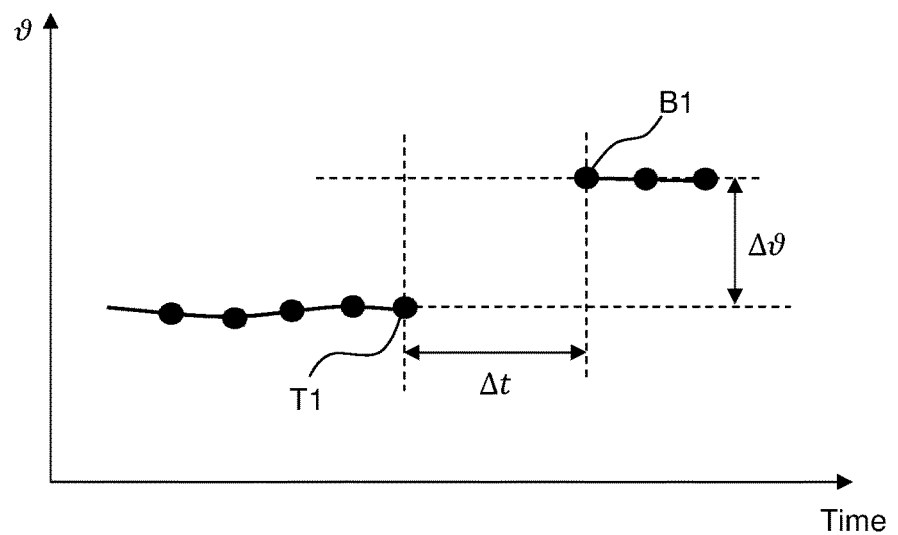
FIGS. 10A-10B illustrates stitching performed by the method in FIG. 6A.

FIG. 10A shows an example of a terminated MPC sequence with end point T1 and a new MPC sequence with starting point B1. Each dot in FIG. 10A corresponds to a delay value. As noted above, step 612 may compute and utilize a difference between one or more parameter values of the end point T1 and the starting point B1, including time $\Delta t$, delay value $\Delta\vartheta$, and power $\Delta P$ (not shown). The differences $\Delta\vartheta$ and $\Delta P$ may be computed based on individual values or local averages. Step 612 may be performed at each time step or intermittently, e.g. whenever a new MPC sequence is identified. Further, step 612 may require a new MPC sequence to contain a minimum number of associated delay values before including the new MPC sequence in the connection analysis. This reduces the impact of spurious delay values.

In a simple implementation example, step 612 may determine the nearest neighbor to each new MPC sequence among the terminated MPC sequences based on a distance given as a function of one of $\Delta t$, $\Delta\vartheta$ and $\Delta P$, or a combination thereof (e.g. a sum of absolute differences, a sum of squares, etc) and identify a connection to the nearest neighbor if the distance to the nearest neighbor is below a threshold.

Figure 10B:
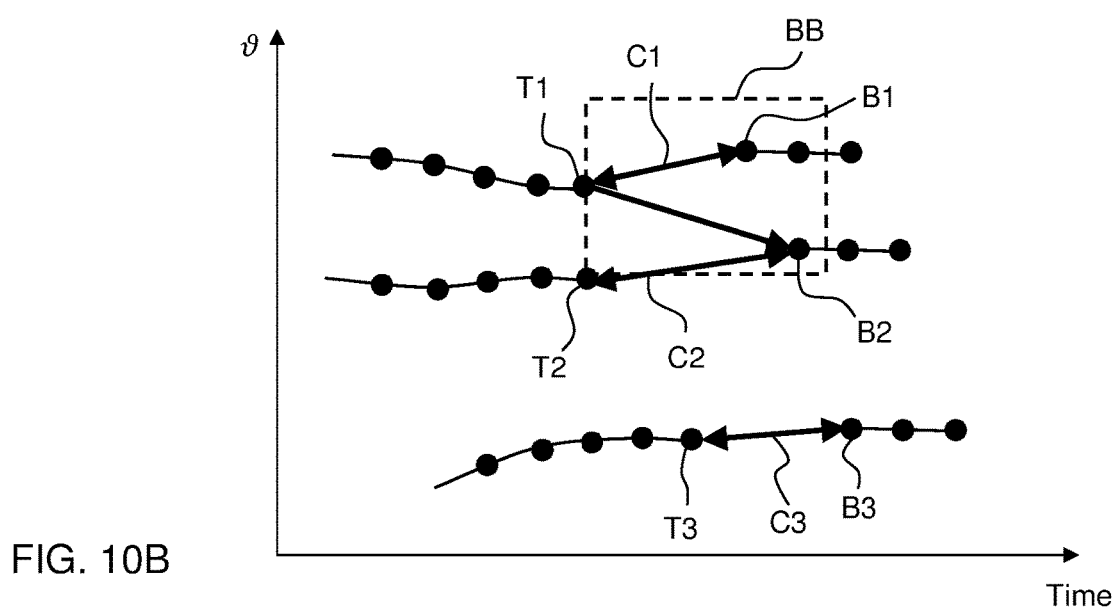

A more advance implementation example is illustrated in FIG. 10B, which shows three end points T1-T3 of terminated MPC sequences and three starting points B1-B3 of new MPC sequences. Here, step 612 identifies forward connections from each end point T1-T3 within a respective bounding box that defines maximum differences in time and delay value, and optionally power, with respect to the respective end point T1-T3. In FIG. 10B, the bounding box BB is shown for end point T1, and forward candidate connections are indicated by right-hand arrows. Step 612 also identifies backward connections from each starting point B1-B2 within a respective bounding box (not shown). In FIG. 10B, backward connections are indicated by left-hand arrows. Step 612 then selects connections among the forward and backward connections that overlap, i.e. among the double-ended arrows in FIG. 10B. In the example of FIG. 10B, connections C1, C2, C3 are identified between T1-B1, T2-B2 and T3-B3, respectively. If there is more than one double-ended arrow to a starting point, step 612 may set the connection to the end point that has the smallest distance to the starting point.

The foregoing description of step 612 is given as a non-limiting example. More advanced data association algorithms may be utilized for evaluating potential connections between end points and starting points, e.g. assignment algorithms such as the Hungarian algorithm, probabilistic data association, etc.

Step 613 operates on each connection identified by step 612 to add fictitious delay values between the new MPC sequence and the previously terminated MPC sequence, to thereby form a connected or stitched MPC sequence. The fictitious delay values are added in accordance with the time resolution of delay values in the data structure 60 and may be computed by interpolation between one or more delay values at the end of the previously terminated MPC sequence and one or more delay values at the beginning of the new MPC sequence. Any interpolation may be used, e.g. linear, polynomial, spline, etc. Thus, step 613 may be seen to heal a gap between discontinuous MPC sequences.

To further improve the quality of the delay values, step 614 may perform a smoothing of all MPC sequences (including stitched MPC sequences, if any) to reduce the impact of measurement and computational noise. Any smoothing algorithm may be used, e.g. moving average, low-pass filtering, smoothing spline, curve fitting, etc. For example, curve fitting with a polynomial function of order 2 or 3 has been found yield good results.

Step 615 outputs the smoothed delay values of all existing MPC sequences (including stitched MPC sequences) at a selected time point. The delay values may be arranged in the above-mentioned selected vector $\vartheta_S$ (FIGS. 5A-5B). It is realized that the time limit applied in step 612 may introduce a lag in the output of selected vectors $\vartheta_S$. There is thus a trade-off between the acceptable lag and the ability to stitch together discontinuous MPC sequences.

Figure 11:
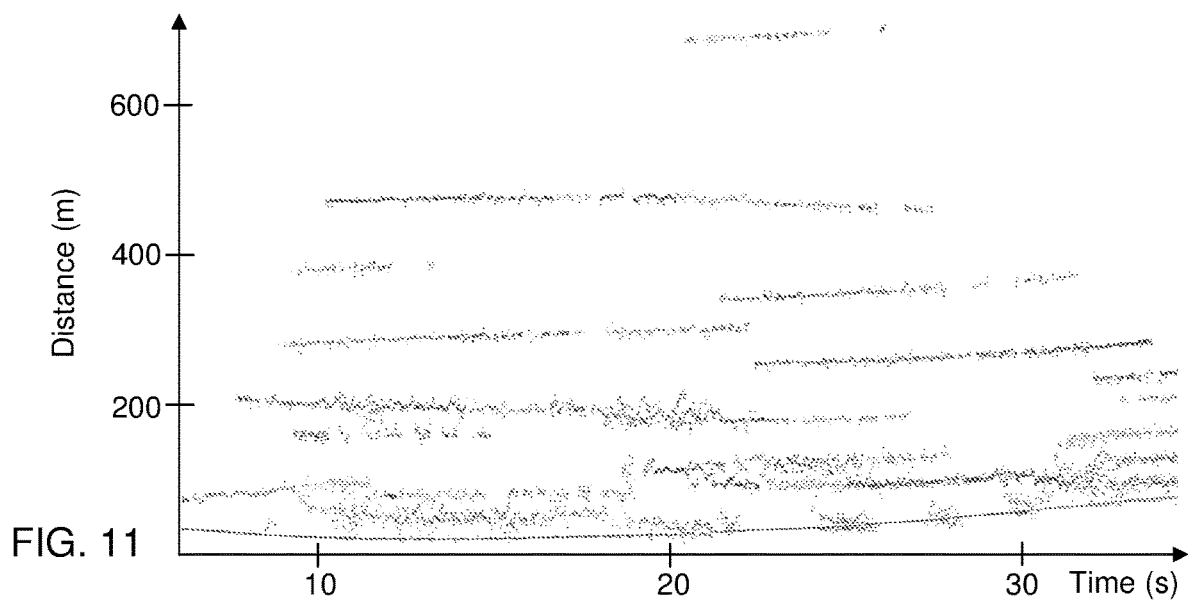
FIG. 11 is a plot of distance values output by the method in FIG. 6A as a function of time.

FIG. 11 shows an example of delay values output by step 615 as a function of time, where the delay values have been converted into propagation length ("distance"). The above-mentioned MPC sequences can be discerned in FIG. 11 as curve-like structures as a function of time.

It may be noted that steps 609-614 may also be applied for processing of other path parameters that may be determined from the reference signal, such as the above-mentioned angle-of arrival θ, so that step 615 outputs an angle vector $\theta_S$ containing selected angle values for existing and stitched MPC trajectories, in addition to or instead of the delay vector $\vartheta_S$.

Figure 6B:
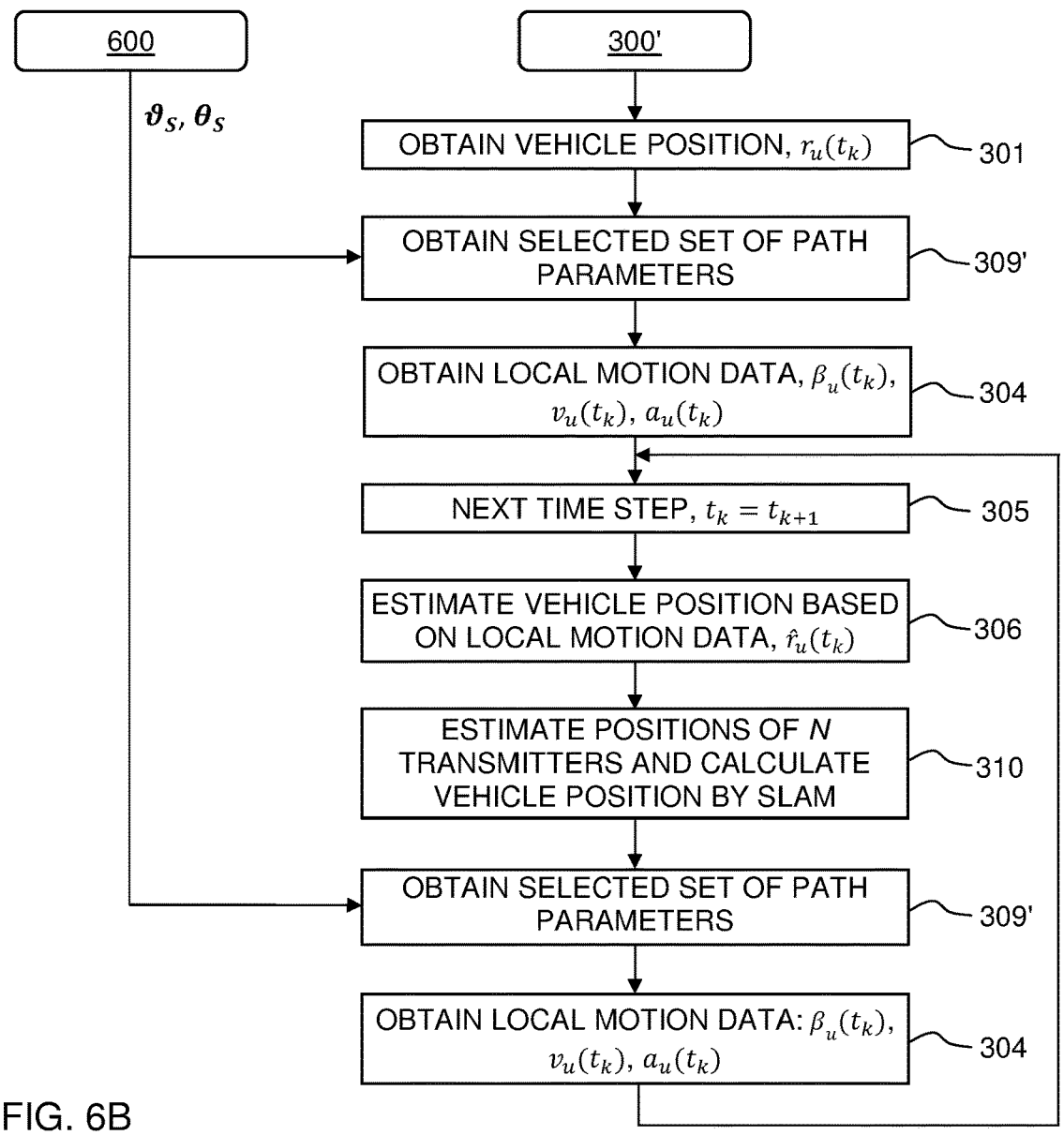

FIG. 6B is a flow chart of a positioning method 300' which operates on path parameters provided by the method 600 in FIG. 6A. Many of the steps in method 300' correspond to steps in the method 300 in FIG. 3 and are assigned the same reference numbers. Step 301 obtains the current position, $r_u(t_k)$, of the vehicle in an absolute coordinate system, and step 309' obtains a current selected set of measured path parameter values generated by the method 600, e.g. one or more of $\vartheta_S$ and $\theta_S$. Step 304 acquires local motion data from a motion detector (450 in FIG. 5A) in the vehicle 1. The method 300' then moves one time step, and step 306 computes an estimated vehicle position $\hat{r}_u(t_k)$ at the current time step $t_k$ based on the local motion data obtained in step 304, i.e. at the preceding time step $t_{k-1}$. Step 310 estimates the positions of the transmitters 4, 4' for the MPCs represented by the path parameter values and calculates an output position POS (FIG. 5A) for the vehicle, by operating a SLAM algorithm on the estimated vehicle position $\hat{r}_u(t_k)$ computed in step 306 at the current time, and possibly during one or more preceding time steps, as well as the path parameter values obtained by step 309' at the preceding time step, and optionally velocity data and/or acceleration data given by the local motion data in step 304. The method 300' then proceeds to step 309' which obtains a current selected set of estimated path parameter values generated by the method 600, and step 304 which acquires local motion data from the motion detector, whereupon the method 300' proceeds to step 305 for execution at the next time step.

Figure 12:
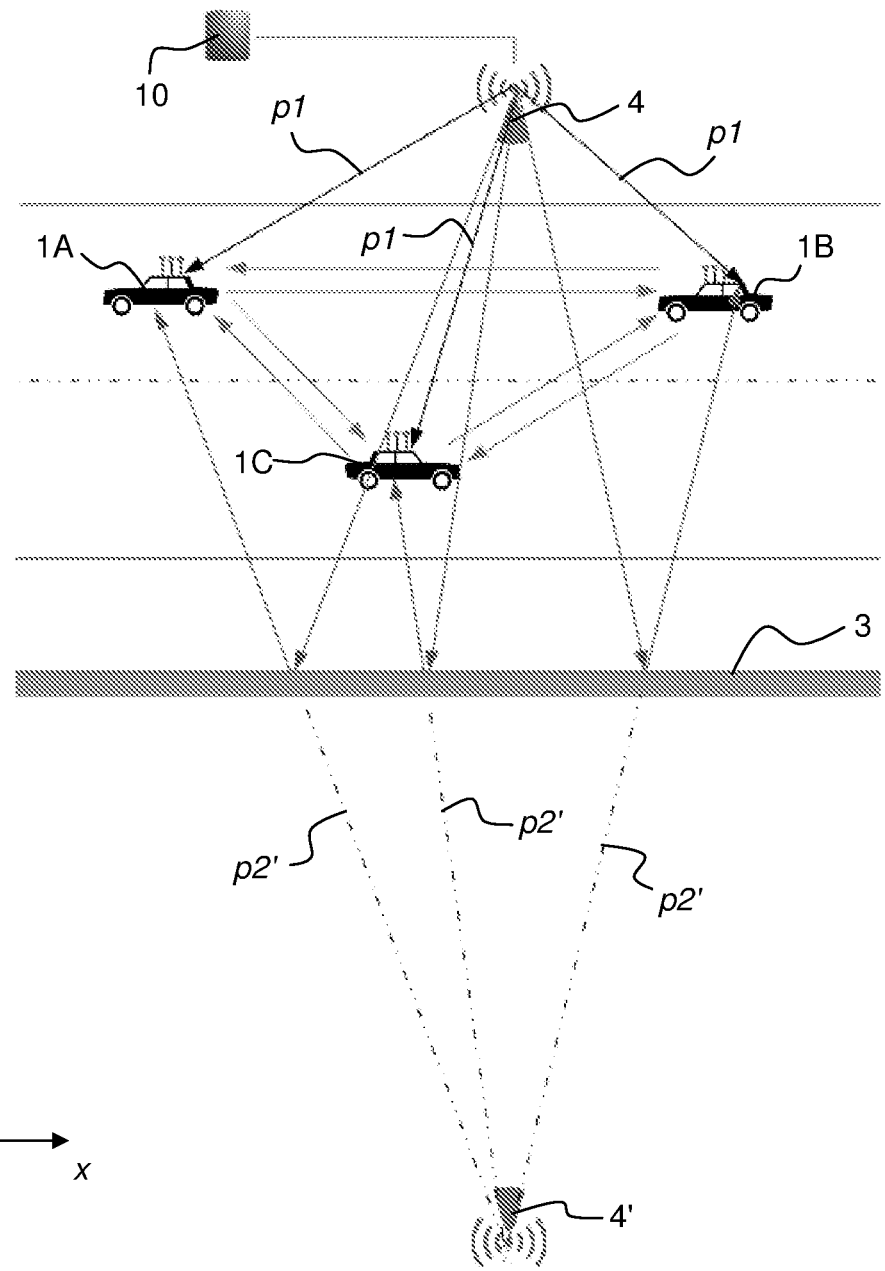
FIG. 12 is a schematic view of signal paths in a system with collaborative positioning.

Embodiments of the present invention also relate to cooperative positioning, as schematically depicted in FIG. 12. In cooperative positioning, the vehicles 1A-1C exchange position information, which may be determined by a positioning device 400 in the respective vehicle 1A-1C in accordance with the first or second embodiments described with reference to FIG. 3 and FIGS. 6A-6B, respectively, or any other technique. The position information may be in the form of positions for the transmitters 4, 4' in the coordinate system (x,y), and/or a combination of the vehicle position POS and measured/estimated path parameters, and/or a 2-dimensional probability function for the position of the respective transmitter 4 4' in the coordinate system (x,y). The dissemination of position information may serve both to speed up the positioning by the respective vehicle 1 and greatly improve the accuracy of the vehicle position POS.

In a first embodiment of cooperative positioning, the position information is communicated between vehicles by any suitable DSRC technology. In FIG. 12, vehicle 1A has estimated the positions of transmitters 4, 4' and broadcasts corresponding position information. The position information is intercepted by vehicles 1B, 1C. Thereby, vehicles 1B, 1C may immediately acquire a relatively accurate position for the transmitters 4, 4' and speed up their own positioning. Vehicles 1B, 1C may then broadcast corresponding position information for interception by yet other vehicles (not shown). The position information received by the positioning device 400 from other vehicles may be applied to improve the computation of path parameters and/or the SLAM processing. For example, transmitter positions may be combined with transmitter positions received from other vehicles, e.g. by (weighted) averaging. In another example, a probability function calculated for the respective transmitter 4, 4' by the SLAM algorithm may be combined with one or more probability functions for the respective transmitter 4, 4' received from other vehicles. For example, the probability functions may be multiplied, and the position of the respective transmitter 4, 4' may be determined as the location of the maximum probability in the resulting probability function.

In a second embodiment of cooperative positioning, which may be combined with the first embodiment, the vehicles may be configured to upload the position information to a server 10, e.g. by communication via BS 4 as shown in FIG. 12. The server 10 may thereby accumulate position information from a large number of vehicles to generate merged position information that estimates of the positions of the transmitters 4, 4' at significantly higher accuracy, either as positions in the coordinate system (x,y) or as 2-dimensional probability functions, and then transmit the merged position information to the vehicles, e.g. via BS 4. The respective vehicle may then apply the merged position information as described for the first embodiment.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, a data processing apparatus. The computer readable medium can be a machine-readable storage device, a machine-readable storage substrate, a memory device, a composition of matter effecting a machine-readable propagated signal, or any combination thereof.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The invention claimed is:

1. A computer-implemented positioning method executed by a controller in a vehicle, said positioning method comprising:
    obtaining local motion data generated by a motion detector in the vehicle;
    computing a current estimated position of the vehicle as a function of the local motion data;
    operating an RF module in the vehicle to receive a reference signal from at least one base station in an environment of the vehicle, wherein the at least one base station is configured for telecommunication and is part of a 3GPP infrastructure;
    processing the reference signal to determine measured values of at least one path parameter for a selected set of multipath components; and
    operating a positioning algorithm on at least the current estimated position and the measured values to calculate a current output position of the vehicle and position information for an origin of each of the multipath components, wherein the positioning algorithm is configured to assume a linear path between the RF module and the position of the origin for each of the multipath components,
    wherein said processing the reference signal comprises: determining, at a current time point, measured values of the at least one path parameter for a plurality of multipath components; and identifying the selected set of multipath components among the plurality of multipath components by finding a best match between the measured values of the at least one path parameter for the plurality of multipath components and preceding values of the at least one path parameter for the selected set of multipath components at a preceding time point.

2. The method of claim 1, further comprising: deriving heading, velocity and acceleration of the vehicle from the local motion data, wherein the current estimated position of the vehicle is computed as a function of the heading, the velocity and the acceleration.

3. The method of claim 1, wherein said identifying the selected set of multipath components comprises: computing, as a function of the preceding values, predicted values of the at least one path parameter for the selected set of multipath components at the current time point; and operating a data association algorithm on the measured values for the plurality of multipath components and the predicted values, wherein the selected set is defined to include the multipath components for which the measured and the predicted values are associated by the data association algorithm.

4. The method of claim 1, wherein the at least one path parameter comprises one or more of: a propagation time of the respective multipath component to the RF module, an angle-of-arrival of the respective multipath component at the RF module, and a power value of the respective multipath component at the RF module.

5. The method of claim 1, wherein the reference signal is a downlink reference signal defined by a 3GPP standard.

6. The method of claim 1, wherein the reference signal comprises one or more of a CRS and a PRS in accordance with 3GPP-LTE.

7. A non-transitory computer-readable medium comprising computer instructions which, when executed by a controller, cause the controller to perform the method of claim 1.

8. A computer-implemented positioning method executed by a controller in a vehicle, said positioning method comprising:
    obtaining local motion data generated by a motion detector in the vehicle;
    computing a current estimated position of the vehicle as a function of the local motion data;
    operating an RF module in the vehicle to receive a reference signal from at least one base station in an environment of the vehicle, wherein the at least one base station is configured for telecommunication and is part of a 3GPP infrastructure;
    processing the reference signal to determine measured values of at least one path parameter for a selected set of multipath components; and
    operating a positioning algorithm on at least the current estimated position and the measured values to calculate a current output position of the vehicle and position information for an origin of each of the multipath components, wherein the positioning algorithm is configured to assume a linear path between the RF module and the position of the origin for each of the multipath components,
    wherein the RF module is operated to receive the reference signal as transmitted between different pairs of antennas on the at least one base station and the RF module, and wherein said processing the reference signal comprises: determining, for each pair of antennas, measured values of the at least one path parameter for a plurality of multipath components; analyzing the measured values for all of the pairs of antennas for grouping of the measured values into clusters; computing cluster values for at least a subset of the clusters as a function of the measured values in the respective cluster; and processing the cluster values to determine the measured values for the selected set of multipath components.

9. The method of claim 8, wherein said processing the reference signal further comprises: eliminating clusters that contain less than a minimum number of measured values.

10. A computer-implemented positioning method executed by a controller in a vehicle, said positioning method comprising:
- obtaining local motion data generated by a motion detector in the vehicle;
- computing a current estimated position of the vehicle as a function of the local motion data;
- operating an RF module in the vehicle to receive a reference signal from at least one base station in an environment of the vehicle, wherein the at least one base station is configured for telecommunication and is part of a 3GPP infrastructure;
- processing the reference signal to determine measured values of at least one path parameter for a selected set of multipath components; and
- operating a positioning algorithm on at least the current estimated position and the measured values to calculate a current output position of the vehicle and position information for an origin of each of the multipath components, wherein the positioning algorithm is configured to assume a linear path between the RF module and the position of the origin for each of the multipath components,
- wherein said processing the reference signal comprises: determining, at a sequence of time steps, measured values of the at least one path parameter for a plurality of multipath components; analyzing the measured values determined at the sequence of time steps for grouping of the measured values into clusters; computing cluster values for at least a subset of the clusters as a function of the measured values in the respective cluster, and processing the cluster values to determine the measured values for the selected set of multipath components.

11. A computer-implemented positioning method executed by a controller in a vehicle, said positioning method comprising:
- obtaining local motion data generated by a motion detector in the vehicle;
- computing a current estimated position of the vehicle as a function of the local motion data;
- operating an RF module in the vehicle to receive a reference signal from at least one base station in an environment of the vehicle, wherein the at least one base station is configured for telecommunication and is part of a 3GPP infrastructure;
- processing the reference signal to determine measured values of at least one path parameter for a selected set of multipath components; and
- operating a positioning algorithm on at least the current estimated position and the measured values to calculate a current output position of the vehicle and position information for an origin of each of the multipath components, wherein the positioning algorithm is configured to assume a linear path between the RF module and the position of the origin for each of the multipath components,
- further comprising: intermittently updating the selected set of multipath components by addition or removal of one or more multipath components as a function of at least one of a quality parameter for the respective multipath component and a duration for the respective multipath component.

12. The method of claim 11, wherein the quality parameter is computed to represent one of as a power of the respective multipath component and a signal-to-noise ratio of the respective multipath component.

13. The method of claim 12, further comprising: storing, in a data structure, time sequences of the measured values for the selected set of multipath components, said addition resulting in a new time sequence and said removal resulting in a terminated time sequence.

14. The method of claim 13, further comprising: analyzing the time sequences in the data structure for identifying one or more connections between one or more new time sequences and one or more terminated time sequences that are separated in time.

15. The method of claim 14, wherein said identifying one or more connections comprises: determining at least one first value of an end point of the one or more terminated time sequences; determining at least one second value of a starting point of the one or more new time sequences; and operating a data association algorithm on the at least first value and the at least one second value.

16. The method of claim 15, wherein the data association algorithm is configured to identify the one or more connections as a best match between the one or more new time sequences and the one or more terminated time sequences.

17. The method of claim 15, wherein the data association algorithm is configured to identify the one or more connections given a limitation comprising one or more of: a maximum time difference between the end point and the starting point, a maximum difference of the at least one path parameter between the end point and the starting point, and a maximum difference in power between the end point and the starting point.

18. The method of claim 15, further comprising: generating, when a connection is identified between a terminated time sequence and a new time sequence, one or more interpolated values by interpolation between the at least one first value of the end point of the terminated time sequence and the at least one second value of the starting point of the new time sequence; forming a connected time sequence by inserting the one or more interpolated values between the end point and the starting point; and determining the measured values for the selected set of multipath components as a function of the connected time sequence.

19. The method of claim 12, further comprising: generating smoothed time sequences by operating a smoothing function on time sequences in a data structure, and determining the measured values for the selected set of multipath components as a function of the smoothed time sequences.

20. A computer-implemented positioning method executed by a controller in a vehicle, said positioning method comprising:
- obtaining local motion data generated by a motion detector in the vehicle;
- computing a current estimated position of the vehicle as a function of the local motion data;
- operating an RF module in the vehicle to receive a reference signal from at least one base station in an environment of the vehicle, wherein the at least one base station is configured for telecommunication and is part of a 3GPP infrastructure;

processing the reference signal to determine measured values of at least one path parameter for a selected set of multipath components; and operating a positioning algorithm on at least the current estimated position and the measured values to calculate a current output position of the vehicle and position information for an origin of each of the multipath components, wherein the positioning algorithm is configured to assume a linear path between the RF module and the position of the origin for each of the multipath components, wherein said processing the reference signal comprises: determining a frequency response vector for the reference signal, generating a first matrix comprising mutually displaced subsets of the frequency response vector; computing eigenvalues for a covariance matrix of the first matrix; identifying significant multipath components based on the eigenvalues; and determining the measured values for the selected set of multipath components as a function of the significant multipath components.

21. The method of claim 20, further comprising: generating a plurality of first matrices at a sequence of time steps, wherein the eigenvalues are computed for covariance matrix that represents a time average of the first matrices.

22. The method of claim 20, further comprising: computing a noise value as a function of a subset of the eigenvalues; and identifying the significant multipath components based on the eigenvalues in relation to the noise value.

23. A positioning device for a vehicle, comprising:
a motion detector configured to generate local motion data for the vehicle,
an RF module, and
a controller which is configured to:
obtain the local motion data from the motion detector;
compute a current estimated position of the vehicle as a function of the local motion data;
operate the RF module to receive a reference signal from at least one base station in an environment of the vehicle, wherein the at least one base station is configured for telecommunication and is part of a 3GPP infrastructure;
process the reference signal to determine measured values of at least one path parameter for a selected set of multipath components; and
    operate a positioning algorithm on at least the current estimated position and the measured values of the at least one path parameter to calculate a current output position of the vehicle and position information for an origin of each of the multipath components, wherein the positioning algorithm is configured to assume a linear path between the RF module and the position of origin for each of the multipath components,
    wherein processing the reference signal to determine measured values comprises: determining, at a current time point, measured values of the at least one path parameter for a plurality of multipath components; and identifying the selected set of multipath components among the plurality of multipath components by finding a best match between the measured values of the at least one path parameter for the plurality of multipath components and preceding values of the at least one path parameter for the selected set of multipath components at a preceding time point.

24. A positioning device for a vehicle, comprising:
a motion detector configured to generate local motion data for the vehicle,
an RF module, and
a controller which is configured to:
obtain the local motion data from the motion detector;
compute a current estimated position of the vehicle as a function of the local motion data;
operate the RF module to receive a reference signal from at least one base station in an environment of the vehicle, wherein the at least one base station is configured for telecommunication and is part of a 3GPP infrastructure;
process the reference signal to determine measured values of at least one path parameter for a selected set of multipath components; and
    operate a positioning algorithm on at least the current estimated position and the measured values of the at least one path parameter to calculate a current output position of the vehicle and position information for an origin of each of the multipath components, wherein the positioning algorithm is configured to assume a linear path between the RF module and the position of origin for each of the multipath components,
    wherein the RF module is operated to receive the reference signal as transmitted between different pairs of antennas on the at least one base station and the RF module, and wherein processing the reference signal to determine measured values comprises: determining, for each pair of antennas, measured values of the at least one path parameter for a plurality of multipath components; analyzing the measured values for all of the pairs of antennas for grouping of the measured values into clusters; computing cluster values for at least a subset of the clusters as a function of the measured values in the respective cluster; and processing the cluster values to determine the measured values for the selected set of multipath components.

25. A positioning device for a vehicle, comprising:
a motion detector configured to generate local motion data for the vehicle,
an RF module, and
a controller which is configured to:
obtain the local motion data from the motion detector;
compute a current estimated position of the vehicle as a function of the local motion data;
operate the RF module to receive a reference signal from at least one base station in an environment of the vehicle, wherein the at least one base station is configured for telecommunication and is part of a 3GPP infrastructure;
process the reference signal to determine measured values of at least one path parameter for a selected set of multipath components; and
    operate a positioning algorithm on at least the current estimated position and the measured values of the at least one path parameter to calculate a current output position of the vehicle and position information for an origin of each of the multipath components, wherein the positioning algorithm is configured to assume a linear path between the RF module and the position of origin for each of the multipath components, wherein the processing the reference signal to determine measured values comprises: determining, at a sequence of time steps, measured values of the at least one path parameter for a plurality of multipath components; analyzing the measured values determined at the sequence of time steps for grouping of the measured values into clusters; computing cluster values for at least a subset of the clusters as a function of the measured values in the respective cluster, and processing the cluster values to determine the measured values for the selected set of multipath components.

26. A positioning device for a vehicle, comprising:

a motion detector configured to generate local motion data for the vehicle, an RF module, and a controller which is configured to:

obtain the local motion data from the motion detector;

compute a current estimated position of the vehicle as a function of the local motion data;

operate the RF module to receive a reference signal from at least one base station in an environment of the vehicle, wherein the at least one base station is configured for telecommunication and is part of a 3GPP infrastructure;

process the reference signal to determine measured values of at least one path parameter for a selected set of multipath components; and operate a positioning algorithm on at least the current estimated position and the measured values of the at least one path parameter to calculate a current output position of the vehicle and position information for an origin of each of the multipath components, wherein the positioning algorithm is configured to assume a linear path between the RF module and the position of origin for each of the multipath components, wherein the controller is further configured to: intermittently update the selected set of multipath components by addition or removal of one or more multipath components as a function of at least one of a quality parameter for the respective multipath component and a duration for the respective multipath component.

27. A positioning device for a vehicle, comprising:

a motion detector configured to generate local motion data for the vehicle, an RF module, and a controller which is configured to:

obtain the local motion data from the motion detector;

compute a current estimated position of the vehicle as a function of the local motion data;

operate the RF module to receive a reference signal from at least one base station in an environment of the vehicle, wherein the at least one base station is configured for telecommunication and is part of a 3GPP infrastructure;

process the reference signal to determine measured values of at least one path parameter for a selected set of multipath components; and operate a positioning algorithm on at least the current estimated position and the measured values of the at least one path parameter to calculate a current output position of the vehicle and position information for an origin of each of the multipath components, wherein the positioning algorithm is configured to assume a linear path between the RF module and the position of origin for each of the multipath components, wherein processing the reference signal to determine measured values comprises: determining a frequency response vector for the reference signal, generating a first matrix comprising mutually displaced subsets of the frequency response vector; computing eigenvalues for a covariance matrix of the first matrix; identifying significant multipath components based on the eigenvalues; and determining the measured values for the selected set of multipath components as a function of the significant multipath components.

* * * * *